US011751232B2

(12) United States Patent
Sevindik et al.

(10) Patent No.: US 11,751,232 B2
(45) Date of Patent: Sep. 5, 2023

(54) COMMUNICATION SYSTEM AND WIRELESS INTERFERENCE MANAGEMENT

(71) Applicant: Charter Communications Operating, LLC, St. Louis, MO (US)

(72) Inventors: Volkan Sevindik, Reston, VA (US); Vijay K. Mechineni, Parker, CO (US); Haider H. Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 61 days.

(21) Appl. No.: 17/159,290

(22) Filed: Jan. 27, 2021

(65) Prior Publication Data
US 2022/0240258 A1    Jul. 28, 2022

(51) Int. Cl.
*H04W 72/541* (2023.01)
*H04W 28/20* (2009.01)
*H04L 5/00* (2006.01)
*H04W 72/0453* (2023.01)

(52) U.S. Cl.
CPC ......... *H04W 72/541* (2023.01); *H04L 5/0037* (2013.01); *H04W 28/20* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2009/0219854 A1* | 9/2009 | Okuda | ................. | H04W 16/26 370/315 |
| 2010/0093364 A1* | 4/2010 | Ribeiro | ............... | H04W 72/082 455/452.2 |
| 2011/0116532 A1* | 5/2011 | Nentwig | ............... | H04L 5/0064 455/73 |
| 2014/0363020 A1* | 12/2014 | Endo | ........................ | H04R 3/04 381/98 |
| 2015/0282231 A1* | 10/2015 | Gunnarsson | .......... | H04W 16/32 370/329 |

(Continued)

FOREIGN PATENT DOCUMENTS

WO    WO-2015172707 A1 * 11/2015 ............... H04L 1/00

*Primary Examiner* — The Hy Nguyen
(74) *Attorney, Agent, or Firm* — Armis IP Law, LLC

(57) ABSTRACT

A communication management resource partitions allocated wireless bandwidth into a first portion (such as first virtual bandwidth or first bandwidth part) and a second portion (such as virtual bandwidth or second bandwidth part). The communication management resource determines wireless interference associated with transmission of first wireless communications over the different bandwidth portions such as from a wireless base station to multiple communication devices while in a first mode. Depending on the wireless interference determined during the first mode, the communication management resource controls conveyance of second wireless communications over the allocated wireless bandwidth to the multiple communication devices in a second mode. In one instance, the communication management system operates one or more communication devices in a device-to-device mode to alleviate wireless interference associated with use of the allocated wireless bandwidth.

39 Claims, 19 Drawing Sheets

(56) References Cited

U.S. PATENT DOCUMENTS

| | | | |
|---|---|---|---|
| 2016/0174166 A1* | 6/2016 | Someya | H04W 16/08 |
| | | | 455/522 |
| 2017/0026885 A1* | 1/2017 | Panigrahi | H04W 72/1252 |
| 2017/0041106 A1* | 2/2017 | Srivastava | H04L 5/0064 |
| 2019/0174453 A1* | 6/2019 | Olofsson | H04L 5/0048 |
| 2021/0029697 A1* | 1/2021 | Bassirat | H04L 5/0092 |
| 2021/0227559 A1* | 7/2021 | Braun | H04W 28/16 |

\* cited by examiner

COMMUNICATION SYSTEM AND WIRELESS INTERFERENCE MANAGEMENT

BACKGROUND

Conventional wireless networks typically include one or more wireless base stations to provide mobile communication devices access to a remote network such as the Internet. One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, a so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. In certain instances, the spectrum access system can be configured to deallocate wireless channels when wireless interference is above a threshold level. Controlled allocation of wireless channels by the spectrum access system helps to prevent interference.

There are multiple different types of wireless channels in a conventional CBRS band. For example, portions of bandwidth in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use. For example, when no incumbent user (such as the government or military) requires use of the channels, the licenses entity is able to freely use the PAL wireless channels in respective one or more predetermined geographical regions without interference by other users (such as lower priority GAA users). The spectrum access system allocates GAA wireless channels to the general public (non-licensed users) when no incumbent uses the GAA channels.

Subsequent to allocation, the wireless base station then uses the allocated bandwidth to provide one or more communication devices access to a remote network such as the Internet.

BRIEF DESCRIPTION OF EMBODIMENTS

Embodiments herein provide novel ways of supporting improved wireless communications (such as via reduced wireless interference) to one or more communication devices in a network environment.

More specifically, a network environment includes a communication management resource (such as communication management hardware, communication management software, or a combination of both). The communication management resource receives allocated wireless bandwidth (such as one or more channels) and partitions the allocated wireless bandwidth into multiple virtual bandwidths (different bandwidth parts) such as a first virtual bandwidth and a second virtual bandwidth.

While in a first mode, the communication management resource determines wireless interference associated with transmission of first wireless communications over the first virtual bandwidth and the second virtual bandwidth such as from a wireless base station to multiple communication devices. Depending on the wireless interference determined during the first mode, the communication management resource controls conveyance of second wireless communications over the allocated wireless bandwidth to the multiple communication devices in accordance with a second mode.

In accordance with further example embodiments, determining the wireless interference associated with transmission of the first wireless communications over the allocated wireless bandwidth includes receiving feedback (such as from the multiple communication devices or other suitable entities) indicating wireless power levels of the multiple communication devices receiving the first wireless communications. Via the received feedback and potentially other information, the communication management resource determines an amount of wireless interference associated with transmission of the first wireless communications to the communication devices.

In further example embodiments, the communication management resource partitions the wireless channel into N virtual bandwidths, where N is an integer greater than or equal to 2; the communication management resource determines the wireless interference via simultaneous transmission of the first communications over the N virtual bandwidths. More specifically, in one embodiment, the communication management resource partitions the allocated bandwidth into at least a first virtual bandwidth (such as a first bandwidth part including first resource blocks or resource elements) and a second virtual bandwidth (such as a second bandwidth part including second resource blocks or resource elements). In one embodiment, the communication management resource controls the wireless base station to, in a first time slot, simultaneously: i) communicate first wireless messages (in first resource blocks) from the wireless base station over the first virtual bandwidth to at least a first communication device of the multiple communication devices, and ii) communicate second wireless messages (in second resource blocks) from the wireless base station over the second virtual bandwidth to at least a second communication device of the multiple communication devices.

The communication management resource tracks (determines) the occurrence of wireless interference associated with use of the allocated bandwidth. For example, in one embodiment, the communication management resource receives first feedback indicating wireless interference associated with the first communication device (or a first set of communication devices) receiving the first wireless messages (via the first virtual bandwidth). The communication management resource receives second feedback indicating wireless interference associated with the second communication device (or a second set of communication devices) receiving the second wireless messages (via the second virtual bandwidth).

In further example embodiments, via the first feedback, the communication management resource produces interference metrics such as including: i) one or more first wireless interference metrics indicating wireless interference associated with communicating the first wireless messages from the wireless base station to the first communication device, ii) one or more second wireless interference metrics indicating wireless interference associated with communicating the second wireless messages from the wireless base station to the second communication device, and so on.

In response to detecting that the wireless interference associated with communicating the messages (such as first wireless messages, second wireless messages, etc.) over the allocated wireless bandwidth to the multiple communication devices is above a threshold for all of the virtual bandwidth portions associated with the allocated bandwidth, the communication management resource repartitions the allocated bandwidth into a different (such as larger or smaller) number of partitions. In a similar manner as previously discussed, the communication management resource determines a respective level of wireless interference associated with communicating over each of the new number of partitions of the allocated wireless bandwidth.

In one embodiment, as further discussed herein, in response to detecting wireless interference is above a threshold level for the first virtual bandwidth (first bandwidth portion) and wireless interference is below a threshold level for the second virtual bandwidth (second bandwidth portion), the communication management resource switches to operating a portion of the multiple communication devices in a device-to-device mode in which a first communication device (not experiencing the wireless interference) of the multiple communication devices receives a wireless message from the wireless base station and wirelessly transmits the wireless message to a second communication device (that did experience the wireless interference) of the multiple communication devices. Because the interference for the second virtual bandwidth is below the threshold level for communications between the wireless base station and the first communication device, the wireless base station continues to communicate the messages targeted to the first communication device directly from the wireless base station to the first communication device.

The dynamic transition to implementing the device-to-device communication mode for the second communication device in this example embodiment alleviates (such as reduces) wireless interference in the network environment, lessening the likelihood that the allocated wireless bandwidth will be revoked (deallocated) by a respective allocation management resource (such as spectrum access system). In other words, if the wireless interference associated with use of the allocated wireless bandwidth is reduced, there is no need for a respective allocation management resource such as a spectrum access system to deallocate or revoke use of the previously allocated wireless bandwidth.

In further example embodiments, the allocated wireless bandwidth is or includes one or more wireless channels or bandwidth allocated from a CBRS (Citizens Band Radio Service) bandwidth. In one embodiment, the communication management resource tracks (determines) the wireless interference associated with the wireless base station simultaneously, or sequentially, communicating: i) a first wireless message from the wireless base station over the wireless channel to a first communication device of the multiple communication devices, and ii) a second wireless message from the wireless base station over the wireless channel to a second communication device of the multiple communication devices.

As previously discussed, in one embodiment, controlling conveyance of the first communications over the allocated wireless bandwidth to the multiple communication devices depending on the determined wireless interference includes: in response to detecting wireless interference below a threshold value for a wireless message communicated from the wireless base station over the wireless channel to the first communication device and detecting wireless interference above a threshold value for a wireless message communicated from the wireless base station over the wireless channel to the second communication device, controlling the first communication device to operate in a device-to-device communications mode in which the first communication device conveys messages from the wireless base station to the second communication device.

Further embodiments herein include, via the communication management resource or other suitable entity, partitioning the wireless bandwidth (such as wireless channel) into a first virtual band and a second virtual band as previously discussed. The communication management resource then determines the wireless interference via simultaneous transmission of the first communications over the first virtual band and the second virtual band. In one embodiment, the first virtual band and the second virtual band operate in accordance with a same carrier frequency in which the wireless base station simultaneously transmits the first communications to the multiple communication devices visa communications over the carrier frequency. In other words, the wireless base station communicates wireless communications over the first virtual bandwidth to a first set of one or more communication devices via the same carrier frequency that the wireless base station communicates wireless communications over the second virtual bandwidth to a second set of one or more communication devices.

In further example embodiments, as previously discussed, the wireless bandwidth is allocated from a CBRS (Citizens Band Radio Service) bandwidth. Although embodiments herein can be implemented via any suitable wireless bandwidth.

Note that any of the resources as discussed herein can include one or more computerized devices, communication management resources, communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and enhanced monitoring and reporting in a network environment. The instructions, when executed by computer processor hardware, cause the computer processor hardware (such as one or more co-located or disparately processor devices or hardware) to: receive allocation of wireless bandwidth; partition the allocated bandwidth; determine wireless interference associated with transmission of first wireless communications over different portions of the allocated wireless bandwidth from a wireless base station; and control conveyance of second wireless communications over the allocated wireless bandwidth to the multiple communication devices depending on the determined wireless interference.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
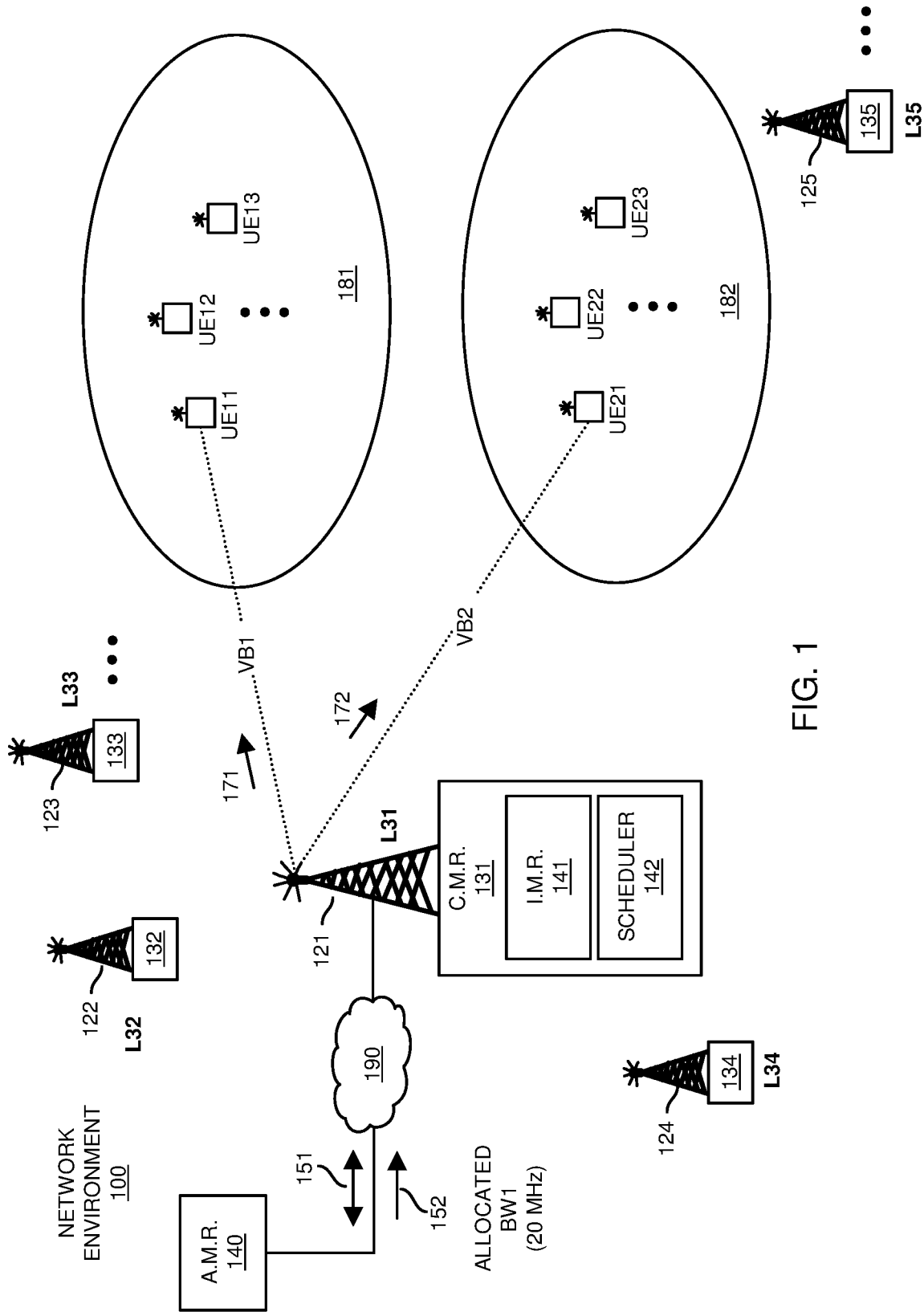
FIG. 1 is an example diagram illustrating a communication network environment and wireless interference testing of allocated bandwidth to communicate with multiple communication devices (a.k.a., user equipment) according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a communication management resource receives allocation of wireless bandwidth. The communication management resource partitions the allocated bandwidth into different portions (such as bandwidth parts) that are tested for occurrence of wireless interference. Via performance feedback such as from the communication devices or other suitable one or more entities, the communication management resource as discussed herein determines wireless interference associated with transmission of first wireless communications over different allocated bandwidth portions (such as first virtual bandwidth, second virtual bandwidth, etc.) of the allocated wireless bandwidth from a wireless base station to multiple communication devices.

In a subsequent communication mode after determining wireless interference, the communication management resource then controls conveyance of second wireless communications over the allocated wireless bandwidth to the multiple communication devices depending on the wireless interference determined in the test mode.

One embodiment herein includes at least temporarily operating a portion (such as one or more) of the communication devices in a device-to-device mode instead of a direct wireless base station to communication device communication mode in order to alleviate wireless interference when using the allocated wireless bandwidth.

For example, in one embodiment, a wireless base station (such as CBSD or other suitable resource) is turned on and registers with a spectrum access system for wireless bandwidth.

The spectrum access system grants an amount of bandwidth such as at least 20 MHz of spectrum up to 100 MHz of wireless bandwidth from a suitable wireless spectrum.

A communication management resource partitions the allocated bandwidth. The wireless base station then transmits data in the allocated bandwidth. More specifically, in one embodiment, the communication management resource associated with the wireless base station creates virtual spectrum bands in an allocated bandwidth, such as 20 MHz of spectrum.

Assume that the 20 MHz of allocated bandwidth includes 100 physical resource blocks. In such an instance, each 10 MHz of the allocated bandwidth includes 50 resource blocks.

In one embodiment:
i). the wireless base station transmits to a first communication device (or first group of communication devices) using the first 50 resource blocks;
ii). the wireless base station transmits to a second communication device (or second group of communication devices) using the second 50 resource blocks.

The wireless base station requests channel quality measurements from the communication devices. In such an instance, the communication devices report back with RSSI information (received signal strength) associated with the communications from the wireless base station to the communication devices. The signal strength information indicates a respective wireless signal level at which communications from the wireless base station are received by the respective communication device.

In one embodiment, the wireless base station (such as communication management resource) uses a reverse look up table to determine the corresponding SNIR level for that CQI. For example, this can be the same method that UEs use to determine CQI level. When the wireless base station transmits wireless signals to a particular UE in an assigned one or more resource block, that UE measures the RSRP level from the transmitted signal from the wireless base station, and matches its measured RSRP level to SNIR level using its respective lookup table. Via another look-up table, the wireless base station uses the SNIR level to determine a CQI level from the SNIR.

Based on the SNIR value and RSSI and other potentially information (effectively interference measurement information associated with the respective virtual bandwidth used to communicate with the communication device), the wireless base station determines the amount interference in each corresponding 10 MHz bandwidth portion of the allocated bandwidth.

The wireless base station repeatedly monitors all spectrum bands (of the allocated bandwidth) such as in 10 MHz chunks. The wireless base station profiles or tracks (determines) interference in each 10 MHz band (virtual bandwidth) based on respective detected interference level in each 10 MHz band.

In one embodiment, if the wireless base station determines that two users (communication devices) experience similar interference levels above a threshold value in the same 10 MHz band being tested, the wireless base station will turn on D2D (device-to-device) mode for these user devices so that they can start transmission between each other. For example, in one embodiment, one of the communication devices is assigned as a main UE that receives data from the wireless base station and sends received data to the wireless base station. The wireless base station uses the same 10 MHz band to send data to different UEs in the network so that CBSD can profile each 10 Mhz for each UE in the network.

In further example embodiments, the wireless base station selects one UE to send data in the DOWNLINK direction and to receive data in the UPLINK direction. This user equipment is called a 'primary UE' and it will distribute data to another 'secondary UEs' in network. In one embodiment, the 'Secondary UE' is connected to 'primary UE' through a respective D2D communication link between the communication devices. When the secondary UE wirelessly sends packets, the 'secondary UE' will mark these packets as 'Secondary UE together with its IMSI' (International Mobile Subscriber Identity). When the primary UE receives these packets from secondary UE, the primary UE will check IMSI field of this packet, and if it is determined to be transmitted from the secondary UE, the primary UE will not change the already recorded IMSI value in the data packets. The primary UE will also record the antenna number that it receives the 'Secondary UE's' data.

The primary UE sends the data received from the 'Secondary UE's in an uplink direction to the wireless base station and receives data directed to the 'Secondary UE's' in the downlink direction from the wireless base station.

The primary UE sends the 'Secondary UE's data to the secondary UE using the same antenna that it received the 'Secondary UE's data from the wireless base station.

Thus, in one embodiment, during device-to-device mode (or D2D), at least one UE (the one experiencing the high wireless interference) will stop using the 10 MHz spectrum band directly, and this band is assigned to another UE in the network (of course, temporarily).

In further example embodiments, the wireless base station turns off D2D mode randomly or at specified times to test and collect measurements and update the interference levels associated with the communication devices. If no interference occurs during subsequent testing of the different bandwidth parts (virtual bandwidths) associated with the allocated bandwidth, the wireless base station communicates directly with the communication devices instead of operating in the device-to-device mode. However, for portions of the allocated bandwidth where interference is detected, the wireless base station implements a device-to-device mode of supporting wireless communications as further discussed herein.

Now, more specifically, with reference to the drawings, FIG. 1 is an example diagram illustrating a communication network and interference testing of allocated bandwidth according to embodiments herein.

As shown, network environment 100 includes bandwidth allocation management resource 140, network 190 (such as the Internet or other suitable entity), and multiple wireless base stations including wireless base station 121 at location L31, wireless base station 122 at location L32, wireless base station 123 at location L33, wireless base station 124 at location L34, wireless base station 125 at location L35, etc.

As further shown, the network environment 100 includes multiple sets of communication devices including: i) a first set 181 of communication devices including communication device UE11, communication device UE12, communication device UE13, etc.; and ii) a second set 182 of communication devices including communication device UE21, communication device UE22, communication device UE23, etc.

Each of the communication devices is mobile or stationary.

The communication devices (such as different instances of user equipment) in network environment 100 can be of any type. For example, the communication devices can include one or more mobile communication devices, wireless stations, computers, etc.

Further in this example embodiment, each wireless base station in network environment 100 has a corresponding communication management resource that manages communications with respective communication devices in the network environment 100.

For example, communication management resource 131 manages operation of wireless base station 121; communication management resource 132 manages operation of wireless base station 122; communication management resource 133 manages operation of wireless base station 123; communication management resource 134 manages operation of wireless base station 124; communication management resource 135 manages operation of wireless base station 125; and so on.

Note that each of the resources in network environment 100 can be configured to include or be configured as appropriate hardware, software, or combination of hardware and software to carry out respective operations as discussed herein.

More specifically, the communication management resource 131 associated with wireless base station 121 as described herein can be implemented via respective communication management hardware, communication management software, or a combination of both.

The interference management resource 141 associated with communication management resource 131 as described herein can be implemented via respective interference management hardware, interference management software, or a combination of both.

The scheduler 142 associated with the communication management resource 131 as described herein can be implemented via respective scheduler management hardware, scheduler management software, or a combination of both.

As previously discussed, network environment 100 includes allocation management resource 140. The allocation management resource 140 in network environment 100 can be implemented via respective allocation management hardware, allocation management software, or a combination of both.

Note further that embodiments herein are applicable to any suitable type of wireless communication system. For example, the communication links between the wireless base station and respective communication devices can be configured to support communications in accordance with any suitable type of wireless communication protocol such as 4G, 5G, LTE (Long Term Evolution), NR, etc.

Figure 2:
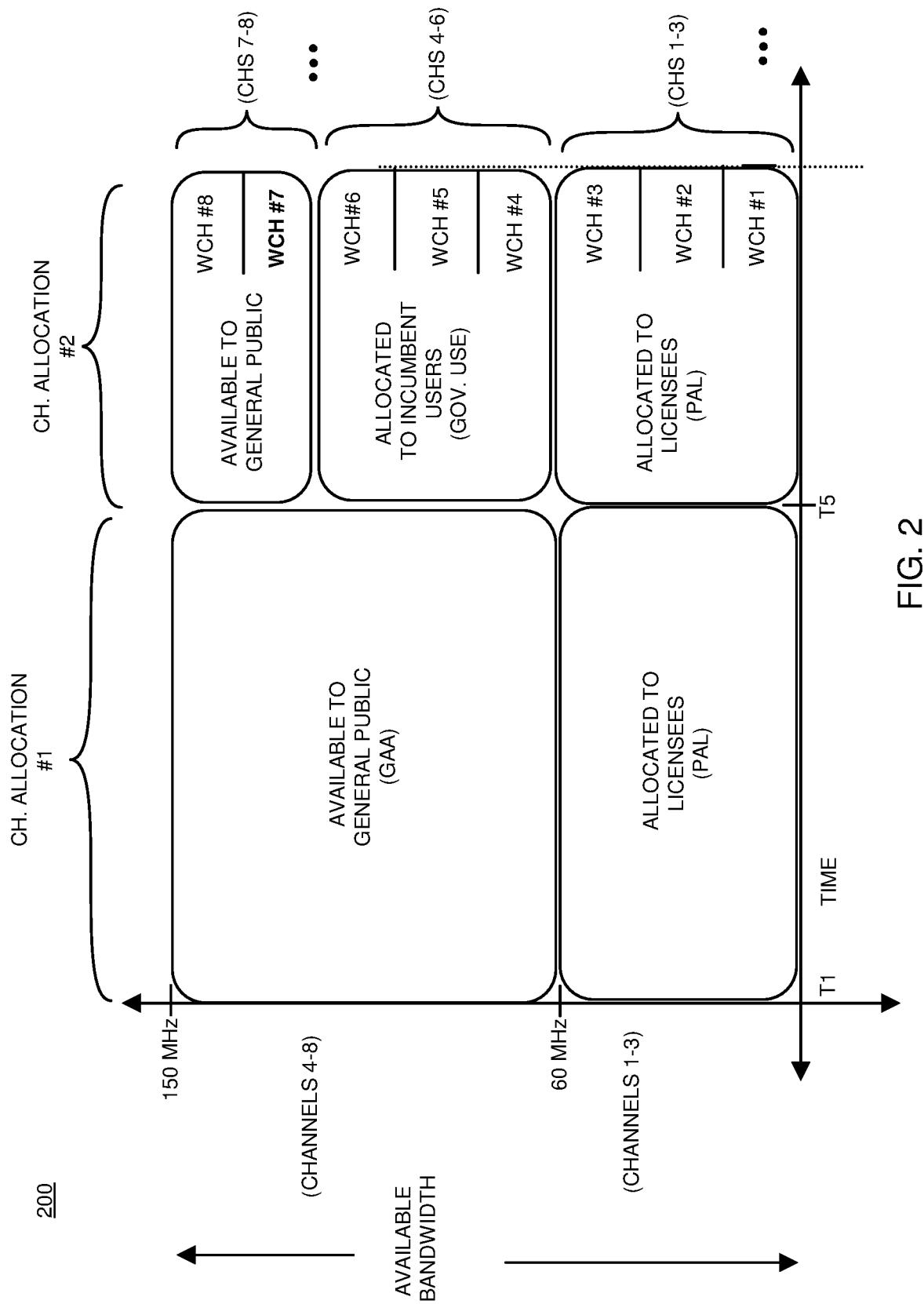
FIG. 2 is an example diagram illustrating allocation of CBRS bandwidth to support communications in a network environment according to embodiments herein.

The wireless base station 121 (such as a CBSD or Citizens Broadband Radio Service Device, general wireless station, etc.) supports wireless communications with the respective communication devices UE11, UE12, . . . , UE21, UE22, etc., via any suitable wireless communication protocol. In one embodiment, the wireless base station 121 implements use of a CBRS (Citizens Band Radio Service) wireless bandwidth and corresponding suitable communication protocol. An example of CBRS bandwidth is shown in FIG. 2.

Referring again to FIG. 1, via communications 151, the communication management resource 131 of wireless base station 121 communicates with the allocation management resource 140 (such as spectrum access system) over network 190 (such as including the Internet or other networks) for allocation of wireless channels to communicate in the network environment 100.

More specifically, via communications 151, the communication management resource 131 (wireless station 121) registers with the allocation management resource 140 and requests allocation of wireless bandwidth.

In response to the registration and corresponding request for allocation of bandwidth, the allocation management resource 140 transmits communications 152 to the communication management resource 131. In one embodiment, the communications 152 generated by the allocation management resource 140 indicate that the wireless bandwidth BW1 (such as 20 MHz of wireless bandwidth or other bandwidth amount) has been allocated for use by the wireless base station 121 to communicate with one or more communication devices in network environment 100. As previously discussed, the wireless network BW1 can be allocated from any suitable wireless band.

Note again that the wireless base station BW1 can be allocated from a CBRS band or any other wireless spectrum.

As previously discussed, the network environment 100 includes multiple wireless base stations that potentially use the same bandwidth BW1 to communicate with a respective communication devices. In such an instance, use of the allocated bandwidth BW1 is susceptible to wireless interference.

In one embodiment, if wireless interference is detected in bandwidth BW1, the allocation management resource 140 may revoke use of the allocated bandwidth. Revocation of bandwidth BW1 by the allocation management resource 140 is undesirable. To avoid revocation of the wireless bandwidth BW1, embodiments herein include being proactive about detecting occurrence of wireless interference associated with the allocated bandwidth BW1 and then implementing a respective solution to reduce the occurrence of wireless interference associated with the allocated bandwidth BW1. In such an instance, the reduction in wireless interference associated with use of allocated bandwidth BW1 as discussed herein alleviates the need for the allocation management resource 140 to deallocate use of bandwidth BW1.

As discussed in FIG. 2, the allocation management resource 140 can be configured to allocate the bandwidth BW1 from a CBRS band or another spectrum. In such an instance, because embodiments herein reduce wireless interference, implementing interference reduction techniques as discussed herein reduces the likelihood that the allocation management resource 140 will need to revoke allocation of corresponding CBRS bandwidth.

In accordance with further example embodiments, the communication management resource 131 initially and repeatedly thereafter at different times operates in an interference analysis mode to determine whether use of the allocated wireless bandwidth BW1 results in undesirable interference. For example, the communication manager resource 131 initially partitions (FIG. 3) the received wireless bandwidth BW1 into multiple different portions such as virtual bandwidth VB1 (first bandwidth part) and the VB2 (second bandwidth part).

Figure 3:
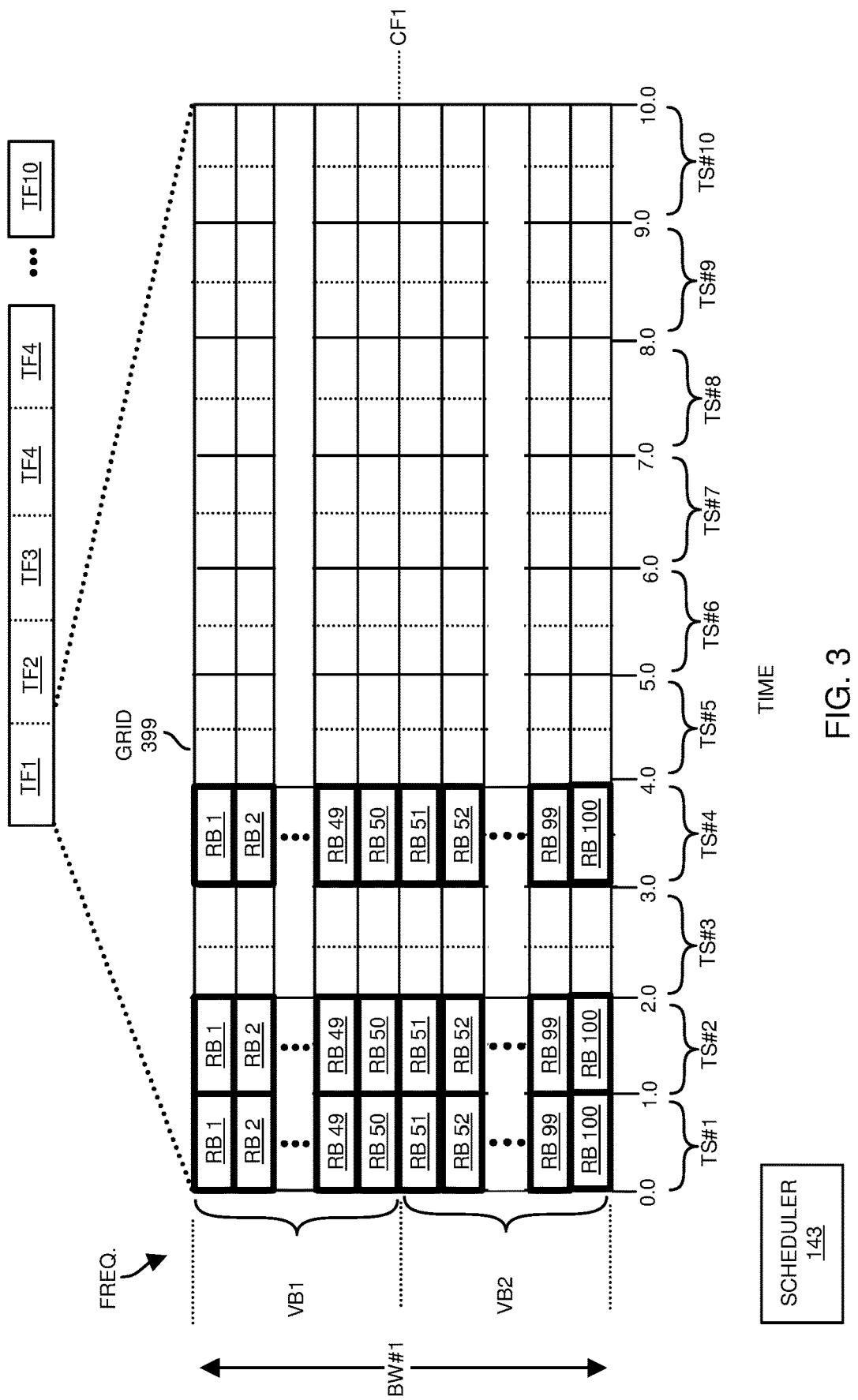
FIG. 3 is an example diagram illustrating partitioning of allocated bandwidth into multiple portions according to embodiments herein.

In one embodiment, as further discussed herein in FIG. 3, the virtual bandwidth VB1 is a first bandwidth part and the virtual bandwidth VB2 is a second bandwidth part associated with the allocated bandwidth BW1. FIG. 3 discusses partitioning of the received bandwidth BW1 into the virtual bandwidth VB1 and virtual bandwidth VB2.

FIG. 2 is an example diagram illustrating allocation of CBRS bandwidth to support communications in a network environment according to embodiments herein.

It is known that a CBRS network (or any wireless network) is an interference limited network, which means the amount of interference in the network environment 100 will determine service quality delivered to respective communication devices (such as wireless subscribers). In a CBRS network, a spectrum access system (SAS) such as allocation management resource 140 manages the interference in network environment 100 (to be below a threshold value for each allocated channel) via careful allocation of wireless channels.

As previously discussed, there are two spectrum classifications in CBRS: one classification type is Priority Access License (PAL) users, and the second classification type is General Availability Access (GAA). PAL is a licensed part of the CBRS spectrum, and GAA is free to anyone that wants to operate in the CBRS band with a spectrum grant permission from the allocation management resource 140. In other words, if channels are free, the spectrum access system (such as allocation management resource 140) allocates wireless channels to different GAA users.

In one embodiment, the wireless bandwidth (such as bandwidth BW1) such as one or more wireless channels allocated to the wireless base station 121 can be revoked (de-allocated from the wireless base station 121) in response to the allocation management resource 140 detecting a condition such as that an incumbent user having a higher priority than the wireless base station 121 needs to use or starts to use such wireless channels. Revocation of bandwidth can include communicating a revocation message from the allocation management resource 140 to the communication management resource 131 of wireless base station 121.

Thus, in one embodiment, the wireless base station 121 and communication management resource 131 provides wireless connectivity via CBRS or other suitable wireless communication protocol to the multiple mobile communication devices in the network environment 100. The allocation management resource 140 can be configured to revoke use of the allocated wireless bandwidth BW1 in response to detecting use allocation of the bandwidth BW1 to the incumbent user (higher priority user).

Note further that there are also so-called hybrid wireless base station operators that implement use of both PAL and GAA wireless bandwidth to communicate with respective communication devices. In GAA, the CBRS band includes 100 MHz of spectrum available that can be granted to any wireless operator as a general user. In certain instances, the allocation management resource 140 allocates the CBRS spectrum in 10 MHz spectrum chunks (or other suitable partitions). Therefore, every 10 MHz bandwidth portion experiences a different level of interference depending on whether the same 10 MHz is being used by another wireless base station in its vicinity.

As discussed herein, embodiments herein include leveraging use of device-to-device (D2D) communication methods to transmit data between communication devices in the network environment 100 in response to detecting wireless interference conditions.

In one non-limiting example embodiment, the allocation management resource 140 allocates bandwidth from a so-called CBRS (Citizens Band Radio System) band operating between 3.550 and 3.700 GHz (GigaHertz) (such as 150 MegaHertz or 15 wireless channels that are each 10 MHz wide or other sized bandwidth portions, or 8 channels approximately 20 MHz each).

In accordance with further embodiments, the allocation management resource 140 (such as spectrum access system, allocation management resource, or other suitable entity) keeps track, at any given time, which wireless channels or portions of the multi-tier wireless spectrum or multi-tier radio band (such as CBRS band) are available and used in the geographical region in which the network environment 100 resides. If government use (a so-called incumbent user) is detected or requested via appropriate input (such as shown around time T5) to the allocation management resource 140, certain channels (such as channels 4, 5, and 6) are no longer available for use as shown in graph 200.

More specifically, in this example, prior to time T5, channels 4-8 are available to the general authorized access users (general public or low priority users) for use; channels 1-3 are available for use by a respective one or more licensee.

As further shown, at or around time T5, assume that the allocation management resource 140 receives input indicating use of a portion (channels 4-6) of the spectrum by an incumbent user such as the government. In such an instance, the allocation management resource 140 updates the channel availability such that only channels 7 and 8 are available to the general authorized access users; channels 4-6 are assigned for use by an incumbent entity requesting use or actually using the channels; wireless channels 1-3 are allocated for use by a first licensee. Thus, after time T5, the wireless channels 4-6 are no longer available for use by the lower priority users (i.e., general authorized access users).

In one embodiment, in response to revocation of the allocation of wireless bandwidth BW1 (such as one of channels 4-6), assuming that bandwidth BW1 is wireless channel #5, the allocation management resource 140 notifies the wireless base station 131 at or around time T5 that the wireless base station 131 is no longer able to use wireless bandwidth BW1 because it has been revoked and assigned for use by the incumbent user.

Thus, between time T1 and time T5, the wireless base station 131 uses the wireless bandwidth BW1 (such as wireless channel #5) to provide the respective user equipment connectivity to the remote network 190. At or around time T5, the communication management resource 140 deallocates use of the wireless bandwidth BW1 (such as wireless channel #5) from the wireless base station 131 in favor of use of the wireless channel by the incumbent user after time T5.

Alternatively, the wireless bandwidth BW1 is a licensed wireless channel such as wireless channel #1. In such an instance, at time T5, the allocation management resource 140 does not revoke use of the wireless bandwidth BW1.

This illustrates the dynamic availability of different wireless bandwidth in a hierarchy as shared in network environment 100. For example, if communication management resource 140 allocates use of wireless channels #4-6 in the hierarchy of available channels to any of base stations, then the allocation management resource 140 must de-allocate use of such wireless channels during conditions in which a higher priority so-called incumbent user relinquishes use of wireless channels 4-6 at or around time T5. In such an instance, as previously discussed, the communication management resource 140 deallocates the wireless channels 4-6 from respective wireless stations for use instead by the incumbent user (higher priority user). Wireless channels 1-3 do not experience FIG. 3 is an example diagram illustrating partitioning of the allocated bandwidth into multiple portions according to embodiments herein.

In further example embodiments, with reference to both FIGS. 1 and 3, the communication management resource 131 partitions the allocated bandwidth BW1 into a first virtual bandwidth (such as including first bandwidth part including fifty physical resource blocks RB1 to RB50) and a second virtual bandwidth (such as a second physical bandwidth part including fifty resource blocks RB51 to RB100).

In one embodiment, bandwidth BW1 is assigned a single carrier frequency CF1 in which to communicate the 100 resource blocks in each of the time slots of a respective timeframe. As further discussed below, the data transmitted in each of the resource blocks is destined for delivery to a particular target communication device via use of an appropriate code assigned to the communication device.

Figure 5:
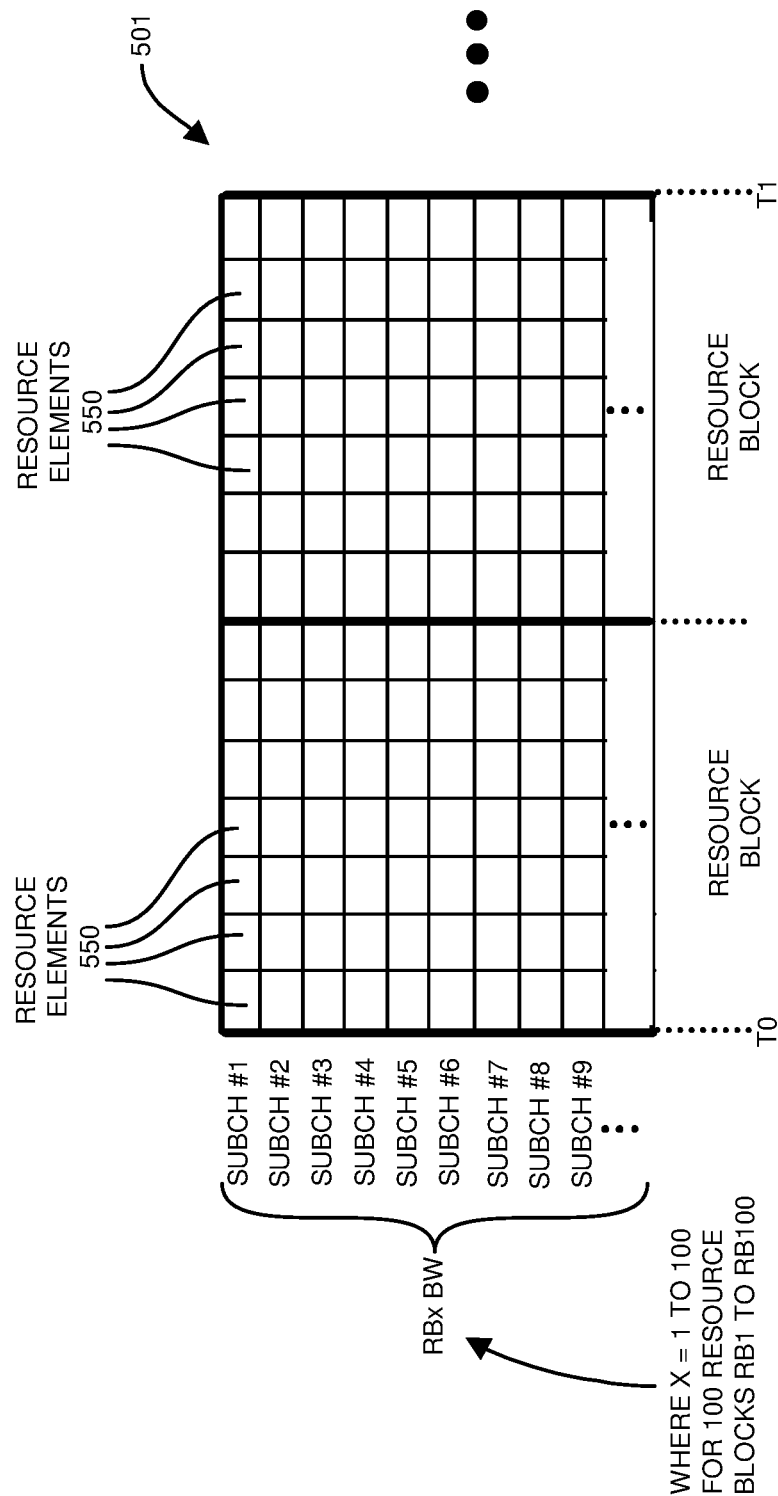
FIG. 5 is an example diagram illustrating details of a resource block according to embodiments herein.

As further shown, each of the resource blocks in grid 399 includes multiple resource elements in which respective data is transmitted. An example of a respective resource block and respective resource elements is shown in FIG. 5.

In one embodiment, referring again to FIGS. 1 and 3, the communication management resource 131 controls the wireless base station 121 to, in a first time slot TS #1 between time T0 and time T1 (and potentially additional time slots TS1, TS2, etc.), simultaneously: i) communicate data in first wireless messages 171 (see FIG. 1) (in first resource blocks RB1, RB2, RB3, . . . RB50) from the wireless base station 121 over the first virtual bandwidth VB1 to a first target communication device UE1 or multiple communication devices, and ii) communicate data in second wireless messages 172 (in second resource blocks RB51, RB52, RB53, . . . RB100) from the wireless base station 121 over the second virtual bandwidth VB2 to a second communication device UE2 or multiple communication devices.

If desired, the communication management resource 131 repeats communicating messages to the respective instances of user equipment via virtual bandwidth VB1 and VB2 over any of one or more timeslots TS #2, TS #3, etc., or timeframes TF1, TF2, etc.

Thus, in one embodiment, the communication management resource 131 uses the first virtual bandwidth VB1 to communicate with one or more of the communication devices UE11, U12, UE13, etc., in the first set 181; the communication management resource 131 uses the second virtual bandwidth VB2 to communicate with one or more of the communication devices UE21, U22, UE23, etc., in the second set 182.

Further embodiments herein include, via the communication management resource 131 or other suitable entity, partitioning the wireless bandwidth BW1 (such as wireless channel) into a first virtual band VB1 and a second virtual band VB2. In one embodiment, the wireless base station 121 communicates data using the first virtual band VB1 and the second virtual band VB2 using the same carrier frequency CF1 (such as center of bandwidth BW1) in which the wireless base station 121 simultaneously transmits the data (such as communications 171) in respective resource blocks over the first carrier frequency CF1 first communications to the multiple communication devices.

In further example embodiments, data in each of the resource blocks is communicated to the target user equipment in accordance with codes (each resource block data is masked by a user equipment identifier). For example, assume that the user equipment UE11 is assigned a unique identifier code UC1; user equipment U21 is assigned a unique identifier code UC2.

Figure 4:
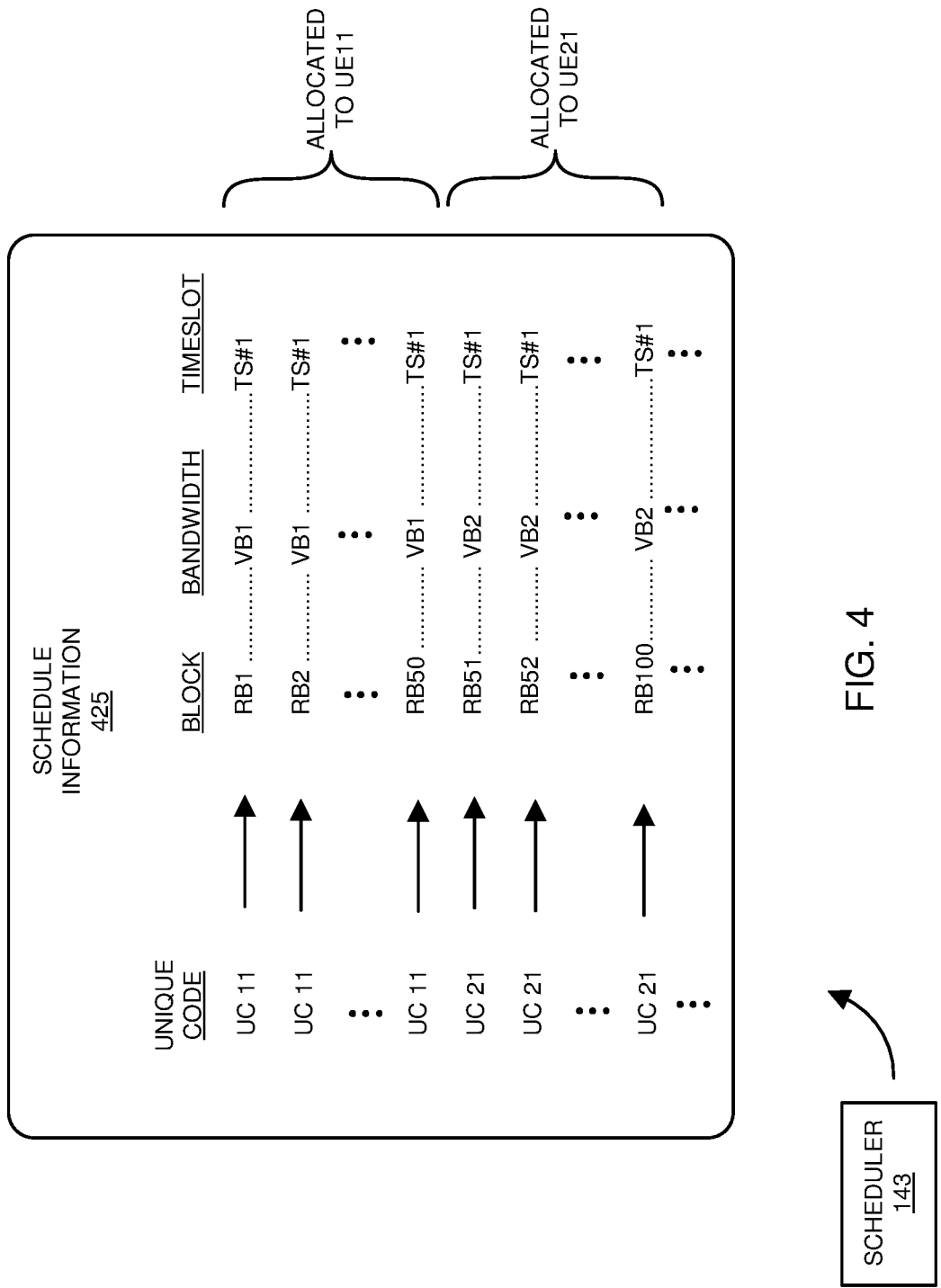
FIG. 4 is an example diagram illustrating generation of schedule information to test occurrence of wireless interference associated with the partitioned allocated bandwidth according to embodiments herein.

In such an instance, as further shown in FIG. 4, the scheduler 143 in this example embodiment notifies the user equipment UE11 of the assignment of resource blocks 1-50 in time slot TS #1 (or other time slots) to receive first data; the scheduler 143 in this example embodiment notifies the user equipment UE21 of the assignment of resource blocks 51-100 in time slot TS #1 (or other timeslots) to receive second data. The respective communication devices receive the data transmitted over carrier frequency CF1 and, in accordance with schedule information 425 (FIG. 4), receive data from the wireless base station 131 in the one or more assigned resource blocks.

FIG. 4 is an example diagram illustrating generation of schedule information to test occurrence of wireless interference associated with allocated bandwidth according to embodiments herein.

In one embodiment, the scheduler resource 140 or other suitable entity generates the schedule information 425. As its name suggests, the schedule information 425 provides notification of which resource block and corresponding data is destined for a particular communication device.

For example, as previously discussed, resource blocks RB1 to RB50 for time slot TS1 of grid 399 are assigned code UC11 associated with the communication device UE11. The schedule information 425 provides notification to the communication device UE11 that the data in resource blocks RB1 to RB50 in time slot TS1 of grid 399 are destined for the communication device UE11. In one embodiment, the communication device UE11 uses its assigned code UC11 to retrieve the data in resource blocks RB1-RB50 associated with communications over carrier frequency CF1 transmitted from the wireless base station 131.

Resource blocks RB51 to RB100 for time slot TS1 of grid 399 are assigned code UC21 associated with the communication device UE21. This provides notification to the communication device UE21 that the data in resource blocks RB51 to RB100 in time slot TS1 of grid 399 are destined for the communication device UE21. The communication device UE21 uses its assigned code UC21 to retrieve the data in resource blocks RB51-RB100 associated with communications over carrier frequency CF1 transmitted from the wireless base station 131.

In one embodiment, as previously discussed, the wireless base station 121 communicates the schedule information 425 to each respective communication device so that the communication devices are aware of which resource blocks are assigned to them.

FIG. 5 is an example diagram illustrating details of a resource block according to embodiments herein.

Resource block 501 is an example of each of the resource blocks in the grid 399.

In this example embodiment, resource block RB1 of grid 399 in time slot TS1 and timeframe TF1 is assigned unique code UC11 destined to communication device UE11. Resource block RB1 includes multiple resource elements 550 (between time T0 and T1). Each of the resource blocks in grid 399 includes multiple resource elements similar to that shown in FIG. 5 for resource block RB1.

In one nonlimiting example embodiment, each resource element 550 enables transmission of one symbol in a respective subchannel. Thus, resource block RB1 (of 1 mS duration and 12 subchannels (sub-carrier frequencies at 15 KHz each) including sub-channel #1, sub-channel #2, sub-channel #3, etc.) supports conveyance of multiple symbols between the wireless base station 131 and the target user equipment assigned to receive data in the resource block RB1. As previously discussed, the user equipment UE1 uses the respective assigned code UC11 to retrieve the data transmitted in the respective resource block RB1.

In one embodiment, each resource block RB1 and the like is made up of twelve subchannels sub-channel #1, sub-channel #2, wireless channel #3, . . . , sub-channel #12, each supporting a bandwidth of 15 KHz, each carrying multiple OFDM symbols (such as 14 or other suitable value) over a respective duration of a time slot (such as 0.5 mS or other suitable value). This means each resource block 501 is 15 KHz×12=180 KHz wide in frequency and is composed of 12×14=168 resource elements (such as symbols). In one embodiment, each resource element supports transmission of a single symbol (schedule of 140 symbols).

As previously discussed, a respective wireless station (such as user equipment) receiving the schedule information 425 derived from the grid 399 for a respective timeframe uses the received schedule information 425 to determine which blocks are directed to in the transmitted wireless link.

Referring again to FIG. 1, the wireless base station 121 transmits data over the bandwidth BW1 over a respective one or more wireless communication links to target communication devices in accordance with the grid 399 and schedule information 425. As further discussed below, each of the communication devices measures a wireless power at which the communications are received over the wireless bandwidth BW1. As further discussed below, the communication devices provide feedback regarding the quality of communications received from the communication devices.

Figure 6:
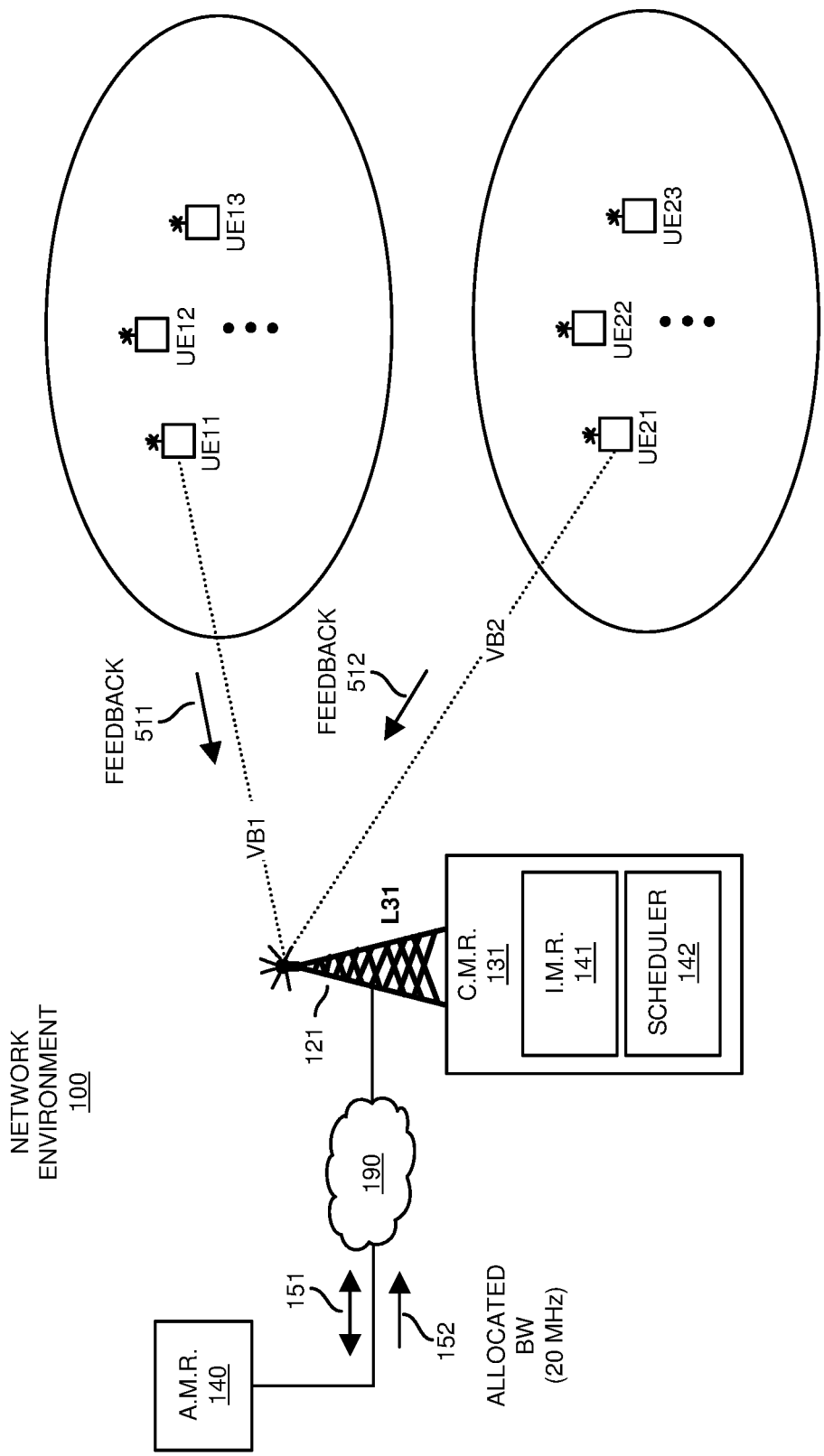
FIG. 6 is an example diagram illustrating receipt of performance feedback from one or more communication devices according to embodiments herein.

FIG. 6 is an example diagram illustrating receipt of performance feedback from one or more mobile communication devices according to embodiments herein.

As shown, each of the communication devices provides feedback regarding a wireless power level at which the communication device received communications from the wireless base station 121 in the assigned resource blocks.

For example, the communication device UE11 provides feedback 511 over a wireless communication link such as virtual bandwidth VB1 or other suitable bandwidth to the wireless base station 121 regarding the signal level at which the communication device UE11 received the data in any of one or more of its assigned resource blocks RB1 to RB50. The communication device UE12 provides feedback 512 over a wireless communication link such as virtual bandwidth VB2 or other suitable bandwidth to the wireless base station 121 regarding the signal level at which the communication device UE12 received the data in one or more of its assigned resource blocks RB51 to RB100.

In one embodiment, as previously discussed, the wireless base station (such as communication management resource) uses a reverse look up table to determine the corresponding SNIR level for that CQI. For example, this can be the same method that UEs use to determine CQI level. When the wireless base station transmits signals to a particular UE, that UE measures the RSRP level from the transmitted signal from the wireless base station, and matches its measured RSRP level to SNIR level using its respective lookup table. Via another look-up table, the wireless base station uses the SNIR level provided by the respective communication device to determine a CQI level from the SNIR.

Based on the SNIR value and RSSI (effectively interference measurement information associated with the respective virtual bandwidth used to communicate with the communication device) and potentially other measurement information, the communication management resource 131 determines the amount interference in each of the corresponding resource blocks and thus virtual bandwidth VB1 and VB2.

Thus, embodiments herein include determining the wireless interference associated with transmission of the first wireless communications 171 and 172 over the allocated wireless bandwidth includes receiving feedback 511, 512, etc., (such as from the multiple communication devices or other suitable entities) indicating wireless power levels of the multiple communication devices receiving the first wireless communications. Via the received feedback, the communication management resource 131 determines an amount of wireless interference associated with transmission of the first wireless communications 171 and 172 to the communication devices.

In one embodiment, the communication management resource 131 determines and tracks the occurrence of wireless interference associated with use of the allocated bandwidth BW1. For example, in one embodiment, the communication management resource 131 receives first feedback indicating wireless interference associated with the first communication device (or a first set of communication devices) receiving the first wireless messages (via the first virtual bandwidth). The communication management resource 131 receives second feedback indicating wireless interference associated with the second communication device (or a second set of communication devices) receiving the second wireless messages (via the second virtual bandwidth).

Figure 7:
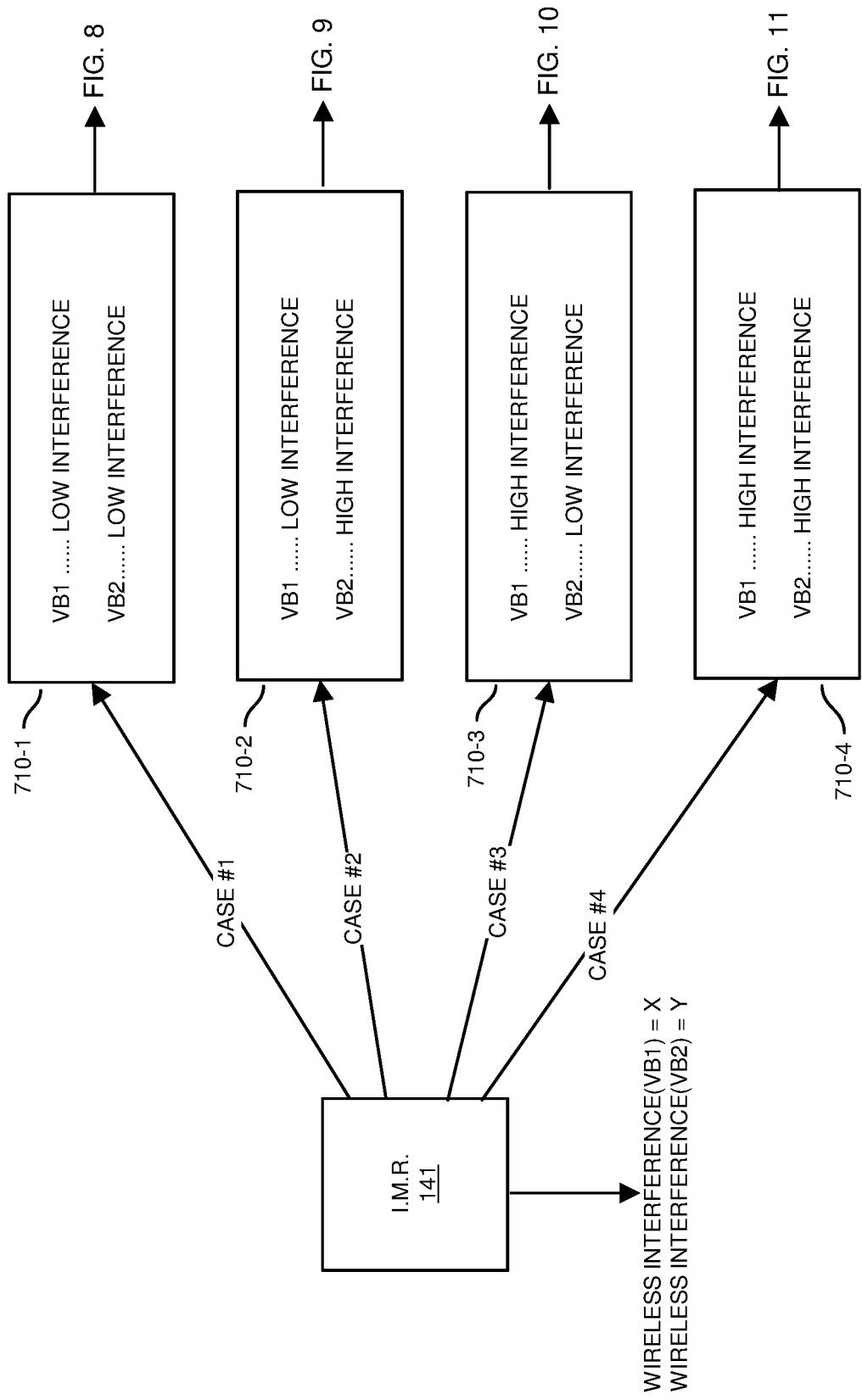
FIG. 7 is an example diagram illustrating different possible results of detecting wireless interference associated with each of the different portions of allocated bandwidth according to embodiments herein.

Depending on the determined level of wireless interference associated with each of the virtual bandwidths VB1 and VB2, the communication management resource 131 implements one of multiple different operational modes as further discussed in FIG. 7.

FIG. 7 is an example diagram illustrating different possible cases of detecting wireless interference associated with each of the different portions of virtual bandwidth according to embodiments herein.

As shown in FIG. 7, based on the received feedback (FIG. 6) from the communication devices during testing use of the virtual bandwidth VB1 and virtual bandwidth VB2, the interference management resource 141 of the communication management resource 131 (and wireless base station 121) produces wireless interference metrics.

For example, via the first feedback associated with receipt of communications in resource blocks 1-100, the interference management resource 141 produces interference metrics such as including: i) a first wireless interference metric indicating wireless interference associated with communicating the wireless messages 171 from the wireless base station 121 to the first communication device UE11 in respective assigned resource blocks via the virtual bandwidth VB1 (resource blocks 1-50, ii) a second wireless interference metric indicating wireless interference associated with communicating the second wireless messages 172 from the wireless base station 121 to the second communication device UE21 in respective assigned resource blocks via the virtual bandwidth VB2 (resource blocks 51-100), and so on.

Via interference management resource 141, the communication management resource 131 determines and tracks the wireless interference associated with the wireless base station 131 simultaneously communicating: i) one or more wireless messages 171 from the wireless base station 131 over the wireless channel (virtual bandwidth VB1 of bandwidth BW1) to a first communication device UE11 of the multiple communication devices, and ii) one or more wireless messages 172 from the wireless base station 131 over the wireless channel (virtual bandwidth VB2 of bandwidth BW2) to a second communication device UE21 of the multiple communication devices.

In one embodiment, based on feedback and determination of wireless interference as previously discussed, the interference management resource 141 produces a first interference metric X indicating an amount of wireless interference associated with communicating with one or more communication devices via the first virtual bandwidth VB1; the interference management resource 141 produces a second interference metric Y indicating an amount of wireless interference associated with communicating with one or more communication devices via the first virtual bandwidth VB2; and so on.

Based on a magnitude of the respective interference metrics X and Y, the interference management resource 141 determines whether the wireless interference associated with using the virtual bandwidth VB1 and virtual bandwidth VB2 is above or below a respective threshold level.

For example, if the magnitude of the detected wireless interference for communications transmitted in resource blocks is less than threshold level, the interference management resource 141 produces a value of LOW INTERFERENCE. Conversely, if the magnitude of the detected wireless interference for communications transmitted in resource blocks is higher than the threshold level, the interference management resource 141 produces a value of HIGH INTERFERENCE.

In case #1 and corresponding tracked outcome of monitoring wireless interference associated with virtual bandwidth VB1 and virtual bandwidth VB2, the communication management resource 131 detects that wireless interference associated with use of the first virtual bandwidth VB1 and second virtual bandwidth VB2 results in low interference as indicated by the wireless interference information 710-1. In such an instance, the communication management resource 131 operates in the communication mode as in FIG. 8.

In case #2 and corresponding tracked outcome of monitoring wireless interference associated with virtual bandwidth VB1 and virtual bandwidth VB2, the communication management resource 131 detects that wireless interference associated with use of the first virtual bandwidth VB1 results in low interference and use of the second virtual bandwidth VB2 results in high interference as indicated by the wireless interference information 710-2. In such an instance, the communication management resource 131 operates in the communication mode as in FIG. 9.

In case #3 and corresponding tracked outcome of monitoring wireless interference associated with virtual bandwidth VB1 and virtual bandwidth VB2, the communication management resource 131 detects that wireless interference associated with use of the first virtual bandwidth VB1 results in high interference and use of the second virtual bandwidth VB2 results in low interference as indicated by the wireless interference information 710-3. In such an instance, the communication management resource 131 operates in the communication mode as in FIG. 10.

In case #4 and corresponding tracked outcome of monitoring wireless interference associated with virtual bandwidth VB1 and virtual bandwidth VB2, the communication management resource 131 detects that wireless interference associated with use of the first virtual bandwidth VB1 results in high interference and use of the second virtual bandwidth VB2 results in high interference as indicated by the wireless interference information 710-4. In such an instance, the communication management resource 131 operates in the communication mode as in FIG. 11.

Figure 8:
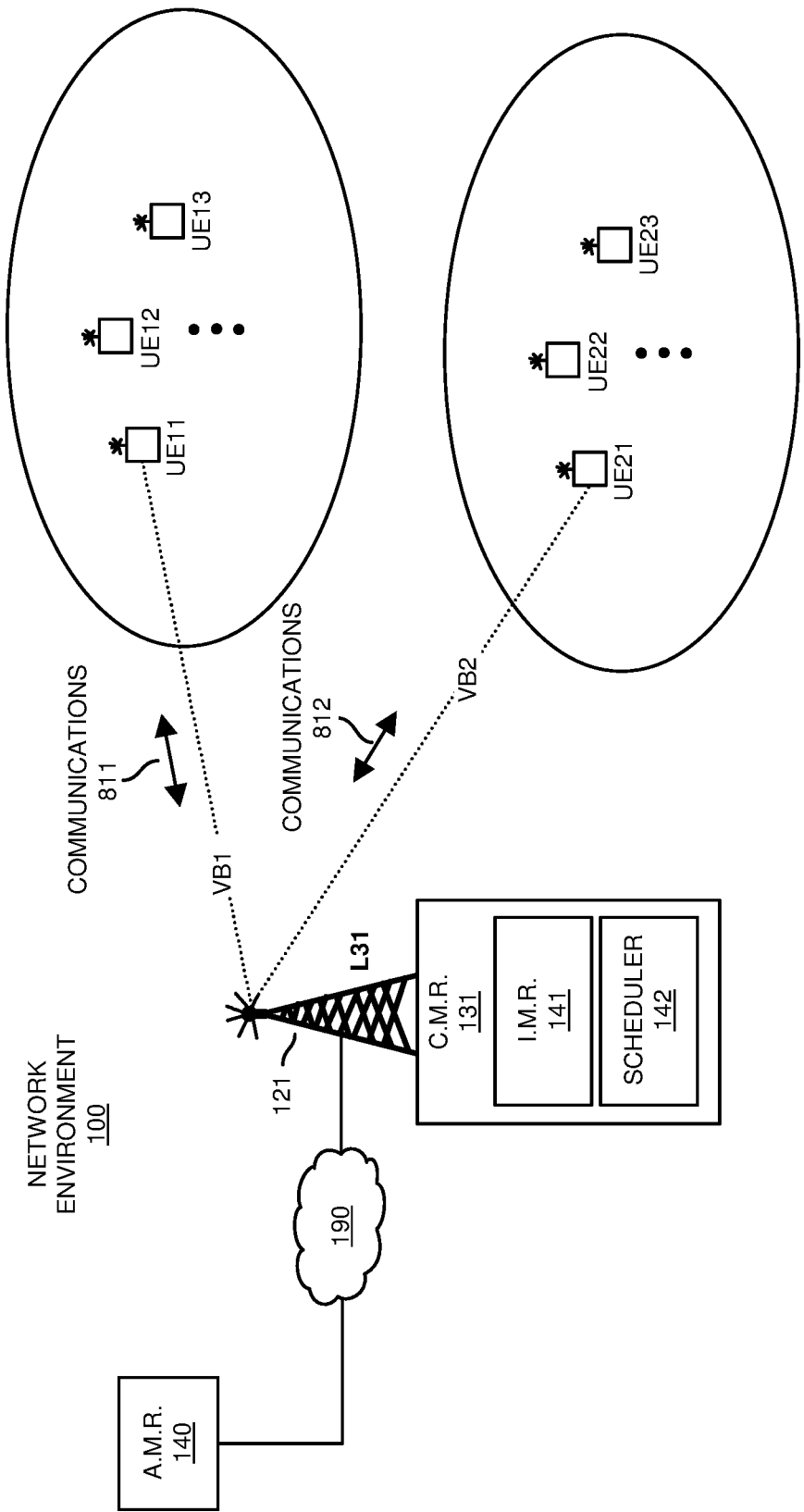
FIG. 8 is an example diagram illustrating use of the allocated wireless bandwidth to communicate between a respective wireless base station and multiple communication devices according to embodiments herein.

FIG. 8 is an example diagram illustrating use of the allocated wireless bandwidth to communicate between a respective wireless base station and multiple mobile communication devices according to embodiments herein.

In this example embodiment, in response to detecting low interference associated with communicating over both the virtual bandwidth VB1 and virtual bandwidth VB2: i) the wireless base station 121 uses the virtual bandwidth VB1 to communicate with at least communication device UE11, and ii) the wireless base station 121 uses the virtual bandwidth VB2 to communicate with at least communication device UE21.

Figure 9:
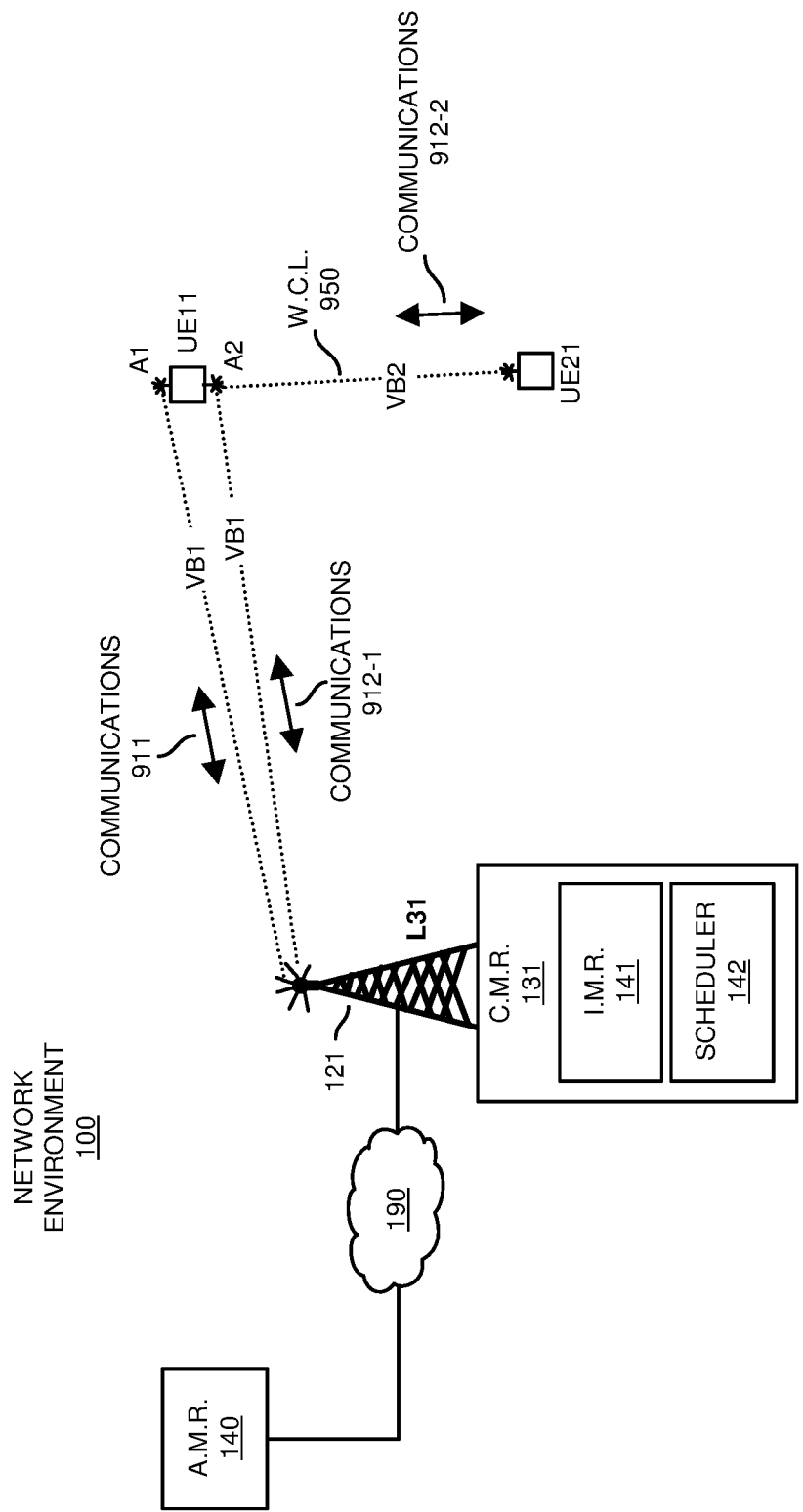
FIG. 9 is an example diagram illustrating implementation of a device-to-device communication mode in response to detecting wireless interference during use of the allocated bandwidth according to embodiments herein.

FIG. 9 is an example diagram illustrating implementation of a device-to-device communication mode in response to detecting wireless interference during use of allocated bandwidth according to embodiments herein.

In one embodiment, as further discussed herein, in response to detecting wireless interference is above a threshold level for the second virtual bandwidth VB2 and wireless interference is below a threshold level for the first virtual bandwidth VB1, the communication management resource 131 switches to operating a portion of the multiple communication devices (such as communication device UE11) in a device-to-device mode in which a first communication device UE11 (not experiencing the wireless interference) is designated as a primary UE. The communication device UE21 is designated as a secondary UE. In such an instance, to alleviate interference, the communication management resource 131 notifies the communication device UE11 and communication device UE21 to operate in a device-to-device mode as shown in FIG. 9.

In the device-to-device mode of FIG. 9, the wireless base station 121 communicates messages (911) targeted to the communication device UE11. Communication device UE11 receives the messages 911 over antenna A1 via virtual bandwidth VB1 using the corresponding any of one or more of the resource blocks 1-50 in a manner as previously discussed.

The wireless base station 121 communicates messages (912-1) targeted to the communication device UE21 over virtual bandwidth VB1 as well. The communication device UE11 receives the wireless messages 912-1 over antenna A2. The communication device UE11 buffers and then forwards the received messages 912-1 as wireless communications 912-2 from antenna A2 over virtual bandwidth VB2 (or potentially virtual bandwidth VB1) to the communication device UE21. Thus, the communication device UE21 receives the wireless messages from the wireless base station 121 through the communication device UE11.

The dynamic transition to implementing the device-to-device communication mode in this example embodiment alleviates (such as reduces) wireless interference in the network environment 100, lessening the likelihood that the allocated wireless bandwidth BW1 will be revoked (deallocated) by the allocation management resource 140 (such as spectrum access system). In other words, in this example, wirelessly communicating messages over virtual bandwidth VB2 from the wireless base station 121 to the communication device UE21 causes undesirable wireless interference above a threshold value. Since operation in the device-to-device mode of FIG. 9 reduces wireless interference associated with use of the bandwidth BW1, there is no need for the allocation management resource 140 to deallocate or revoke use of the allocated wireless bandwidth BW1.

Thus, operation in the device-to-device mode as discussed herein in FIG. 9 is useful to reduce or eliminate wireless interference and the likelihood that the allocation management resource 140 will need to revoke allocation of the wireless bandwidth BW1.

Figure 10:
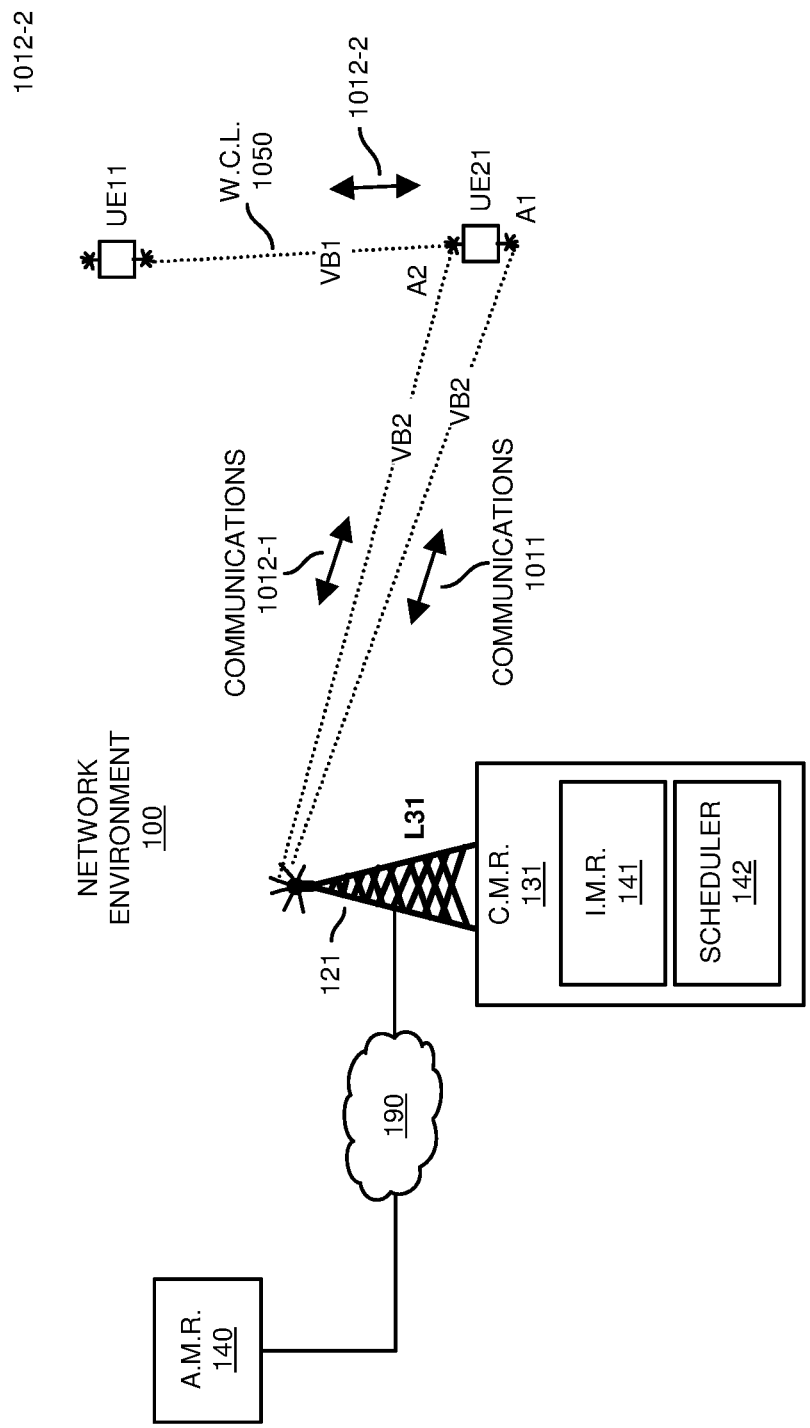
FIG. 10 is an example diagram illustrating implementation of a device-to-device communication mode in response to detecting wireless interference during use of allocated bandwidth according to embodiments herein.

FIG. 10 is an example diagram illustrating implementation of a device-to-device communication mode in response to detecting wireless interference during use of allocated bandwidth according to embodiments herein.

In one embodiment, as further discussed herein, in response to detecting wireless interference is above a threshold level for the first virtual bandwidth VB1 and wireless interference is below a threshold level for the second virtual bandwidth VB2, the communication management resource 131 switches to operating a portion of the multiple communication devices (such as communication device UE21) in a device-to-device mode in which the communication device UE21 (not experiencing the wireless interference) is designated as a primary UE. In such an instance, to alleviate interference, the communication management resource 131 notifies the communication device UE11 and communication device UE21 to operate in a device-to-device mode as shown in FIG. 10.

In the device-to-device mode of FIG. 10, the wireless base station 121 communicates messages (1011) targeted to the communication device UE21. Communication device UE21 receives the messages 1011 over antenna A1 via virtual bandwidth VB2 using assigned resource blocks in a manner as previously discussed.

The wireless base station 121 communicates messages (1012-1) targeted to the communication device UE21 over virtual bandwidth VB2 as well. The communication device UE21 receives the messages 1012-1 over antenna A2. The communication device UE21 buffers and then forwards the received messages 1012-1 as wireless communications 1012-2 from antenna A2 of communication device UE21 over virtual bandwidth VB1 (or virtual bandwidth VB2) and wireless communication link 1050 to the communication device UE11.

The dynamic transition to implementing the device-to-device communication mode in this example embodiment alleviates (such as reduces or eliminates) wireless interference in the network environment 100, lessening the likelihood that the allocated wireless bandwidth BW1 will be revoked (deallocated) by the allocation management resource 140 (such as spectrum access system). In other words, in this example, wirelessly communicating messages over virtual bandwidth VB1 from the wireless base station 121 to the communication device UE11 causes undesirable wireless interference above a threshold value. Since operation in the device-to-device mode of FIG. 10 reduces wireless interference associated with use of the bandwidth BW1, there is no need for the allocation management resource 140 to deallocate or revoke use of the allocated wireless bandwidth BW1.

Thus, operation in the device-to-device mode as discussed herein in FIG. 10 is useful to reduce wireless interference and the likelihood that the allocation management resource 140 will need to revoke allocation of the wireless bandwidth BW1.

Figure 11:
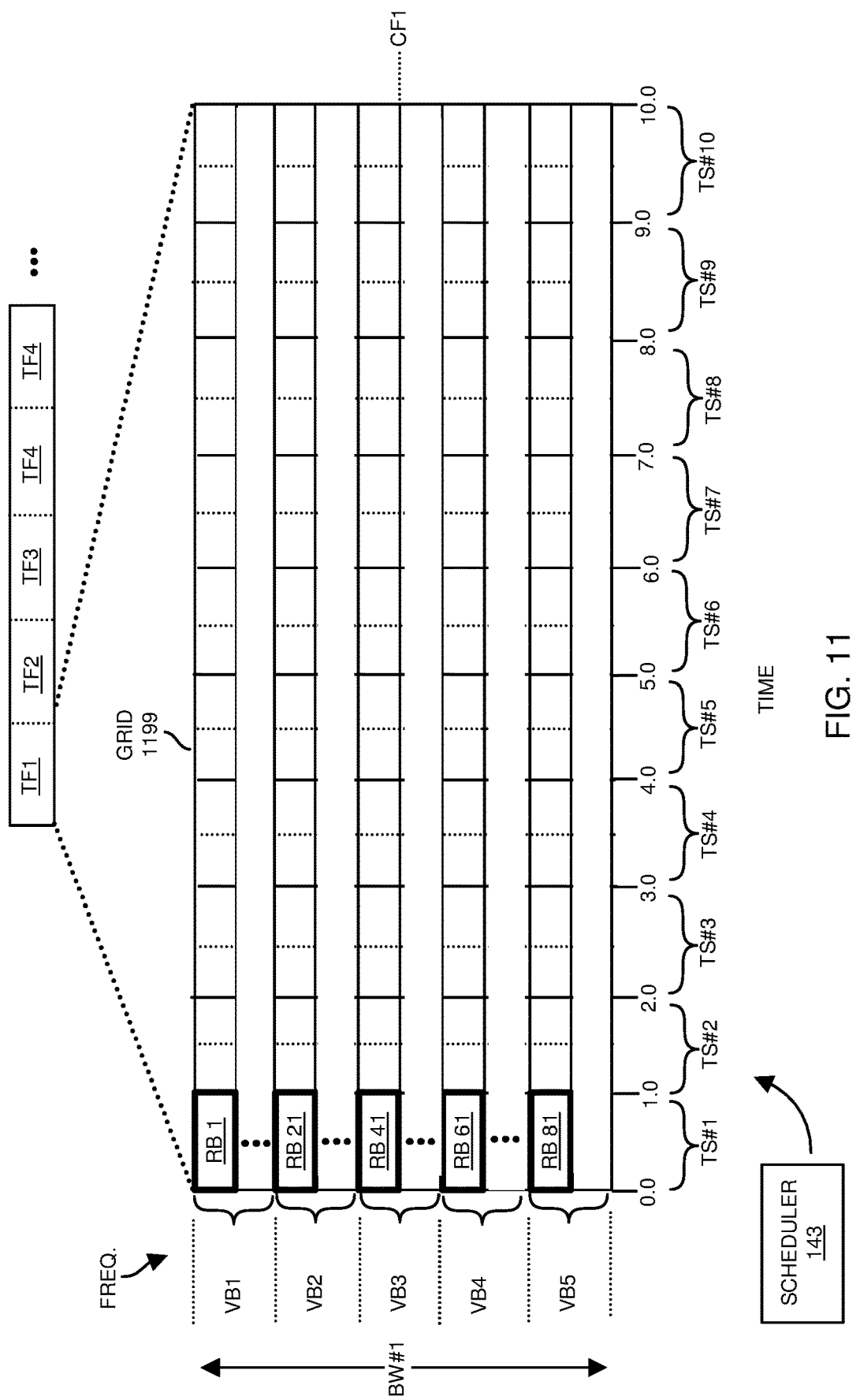
FIG. 11 is an example diagram illustrating repartitioning of the allocated bandwidth into multiple different virtual bands and testing of same to identify occurrence of wireless interference associated with different portions of the allocated bandwidth according to embodiments herein.

FIG. 11 is an example diagram illustrating repartitioning of the allocated bandwidth into multiple different virtual bands and testing of same to identify occurrence of wireless interference according to embodiments herein.

In response to detecting that the wireless interference associated with communicating the messages (such as wireless messages 171 and 172) over the allocated wireless bandwidth BW1 to the multiple communication devices is above a threshold for both the virtual bandwidths VB1 and VB2 in case #4 of FIG. 7, the communication management resource 131 repartitions the allocated bandwidth BW1 into a different (such as larger or smaller) number of partitions.

In one embodiment, the bandwidth BW1 is repartitioned into a greater number of virtual bandwidth portions (such as bandwidth parts) to identify (hopefully) at least a portion of the bandwidth BW1 that does not experience wireless interference such that the communication management resource 131 can at least temporarily operate in a device-to-device mode in a manner as previously discussed to reduce interference levels.

Note that the grouping of communication devices into different virtual bandwidth groups can be implemented in any suitable manner. For example, the communication management resource 131 can be configured to identify communication devices that are close in proximity to each other (with respect to bandwidth BW1) and group the respective communication devices based on location; the communication management resource 131 can be configured to group the communication devices based on type; etc.

In this example embodiment, the communication management resource 131 produces a first group to include communication devices UE11, UE12, UE13, etc.; the communication management resource 131 allocates virtual bandwidth VB11 and corresponding contiguous resource blocks RB1 to RB20 (20 resource blocks) to communicate with the communication devices UE11, UE12, UE13, etc.

The communication management resource 131 produces a second group to include communication devices UE21, UE22, UE23, etc.; the communication management resource 131 allocates virtual bandwidth VB21 and corresponding contiguous resource blocks RB21 to RB40 (20 resource blocks) to communicate with the communication devices UE21, UE22, UE23, etc.

The communication management resource 131 produces a third group to include communication devices UE31, UE32, UE33, etc.; the communication management resource 131 allocates virtual bandwidth VB31 and corresponding contiguous resource blocks RB41 to RB60 (20 resource blocks) to communicate with the communication devices UE31, UE32, UE33, etc.

The communication management resource 131 produces a fourth group to include communication devices UE41, UE42, UE43, etc.; the communication management resource 131 allocates virtual bandwidth VB41 and corresponding contiguous resource blocks RB61 to RB80 (20 resource blocks) to communicate with the communication devices UE41, UE42, UE43, etc.

The communication management resource 131 produces a second group to include communication devices UE51, UE52, UE53, etc.; the communication management resource 131 allocates virtual bandwidth VB51 and corresponding contiguous resource blocks RB81 to RB100 (20 resource blocks) to communicate with the communication devices UE51, UE52, UE53, etc.

In a similar manner as previously discussed, the communication management resource the identifying a respective level of wireless interference associated with communicating over each of the new number of partitions of the allocated wireless bandwidth.

Additionally, the allocated resource blocks are contiguous with each other.

Figure 12:
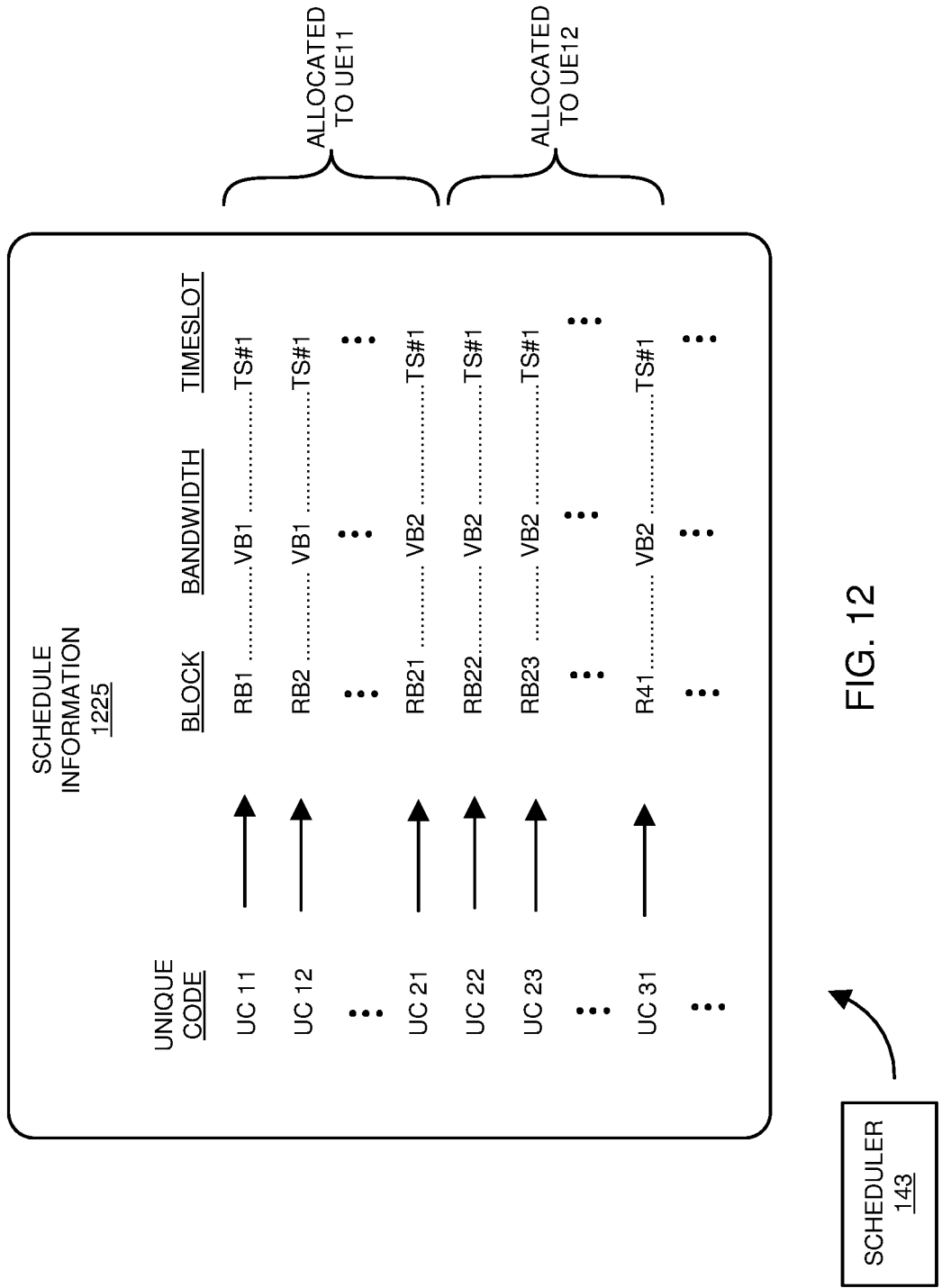
FIG. 12 is an example diagram illustrating generation of schedule information to test occurrence of wireless interference associated with the repartitioned allocated bandwidth according to embodiments herein.

FIG. 12 is an example diagram illustrating generation of schedule information to test occurrence of wireless interference associated with the repartitioned allocated bandwidth according to embodiments herein.

As shown in FIG. 12, the scheduler 143 produces schedule information 1225 indicating different communication devices assigned to receive communications from the wireless base station 121.

For example, with reference to the schedule information 1225, the assignment of unique code UC11 (which is the unique mask code assigned to the communication device UE11) to resource block RB1 indicates that the communication device UE11 is scheduled to receive communications from the wireless base station 121 in resource block RB1 in time slot TS1; the assignment of unique code UC12 (which is the unique mask code assigned to the communication device UE12) to resource block RB2 indicates that the communication device UE12 is scheduled to receive communications from the wireless base station 121 in resource block RB2 in time slot TS1; the assignment of unique code UC13 (which is the unique mask code assigned to the communication device UE13) to resource block RB3 indicates that the communication device UE13 is scheduled to receive communications from the wireless base station 121 in resource block RB3 in time slot TS1; etc.

The assignment of unique code UC21 (which is the unique mask code assigned to the communication device UE21) to resource block RB21 indicates that the communication device UE21 is scheduled to receive communications from the wireless base station 121 in resource block RB21 in time slot TS1; the assignment of unique code UC22 (which is the unique mask code assigned to the communication device UE22) to resource block RB22 indicates that the communication device UE22 is scheduled to receive communications from the wireless base station 121 in resource block RB22 in time slot TS1; the assignment of unique code UC23 (which is the unique mask code assigned to the communication device UE23) to resource block RB23 indicates that the communication device UE23 is scheduled to receive communications from the wireless base station 121 in resource block RB23 in time slot TS1; and so on.

The assignment of unique code UC31 (which is the unique mask code assigned to the communication device UE31) to resource block RB41 indicates that the communication device UE31 is scheduled to receive communications from the wireless base station 121 in resource block RB41 in time slot TS1; and so on.

In one embodiment, the wireless base station 121 notifies the respective communication devices of the schedule information 1225 and which virtual bandwidth to receive respective communications from the wireless base station 121.

Figure 13:
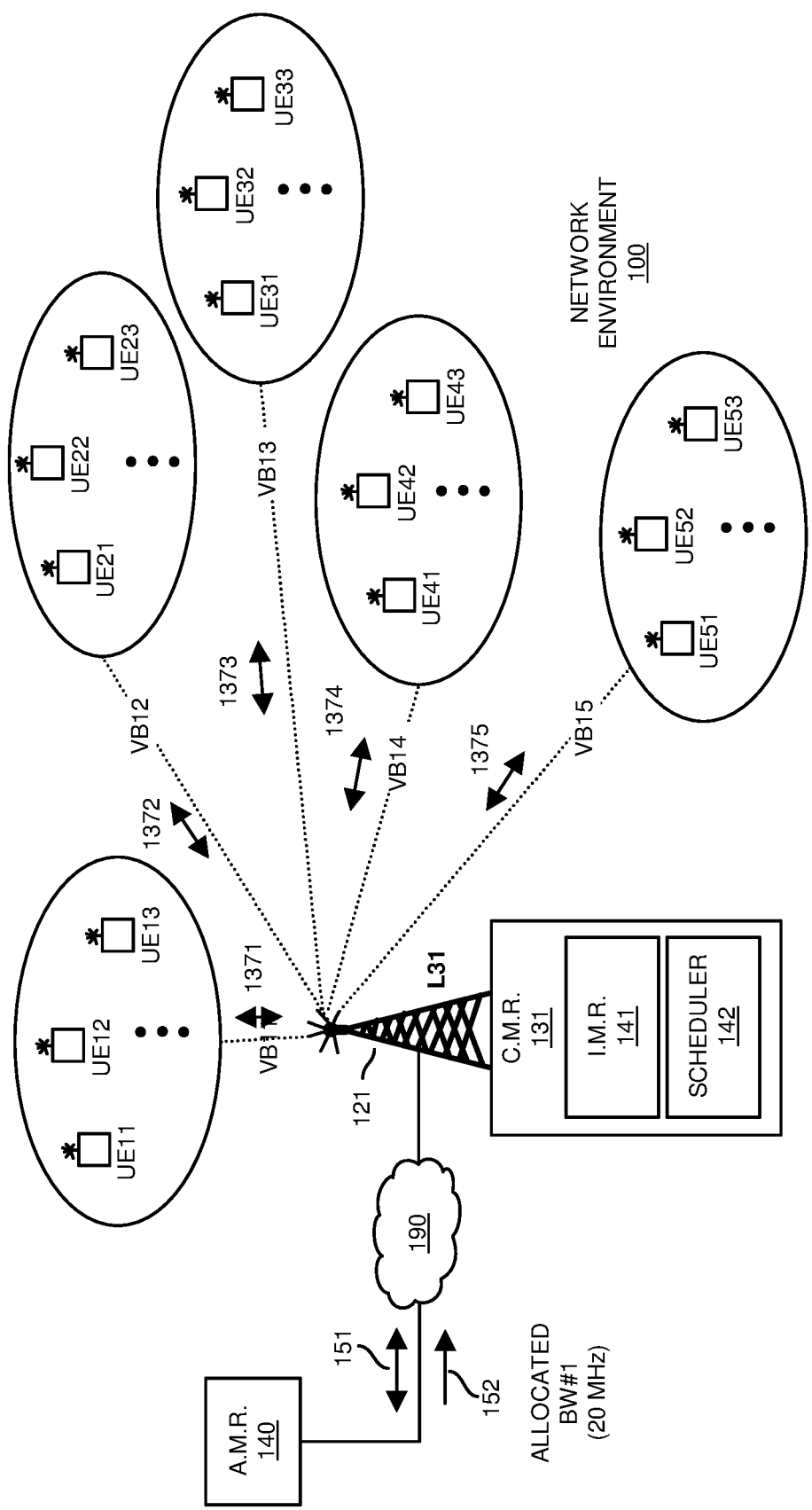
FIG. 13 is an example diagram illustrating a communication network environment and testing use of the repartitioned allocated bandwidth according to embodiments herein.

FIG. 13 is an example diagram illustrating a communication network environment and testing use of the repartitioned allocated bandwidth according to embodiments herein.

In accordance with the schedule information 1225 generated by the scheduler 142 in the different virtual bandwidths VB11, VB12, VB13, VB14, and VB15, the wireless base station 121 transmits corresponding communications over respective virtual bandwidth and resource blocks to the different groups of communication devices.

For example, in accordance with the grid 1199 and schedule information 1225, the wireless base station 121 transmits communications 1371 over virtual bandwidth VB11 and corresponding resource blocks RB1 to RB20 to the group of communication devices UE11, UE12, UE13, etc.; the wireless base station 121 transmits communications 1372 over virtual bandwidth VB12 and corresponding resource blocks RB21 to RB40 to the group of communication devices UE21, UE22, UE23, etc.; the wireless base station 121 transmits communications 1373 over virtual bandwidth VB13 and corresponding resource blocks RB41 to RB60 to the group of communication devices UE31, UE32, UE33, etc.; the wireless base station 121 transmits communications 1374 over virtual bandwidth VB14 and corresponding resource blocks RB61 to RB80 to the group of communication devices UE41, UE42, UE43, etc.; the wireless base station 121 transmits communications 1375 over virtual bandwidth VB15 and corresponding resource blocks RB81 to RB100 to the group of communication devices UE51, UE52, UE53, etc.

Each of the communication devices measures a magnitude of wireless data communicated in a respective physical resource block.

Figure 14:
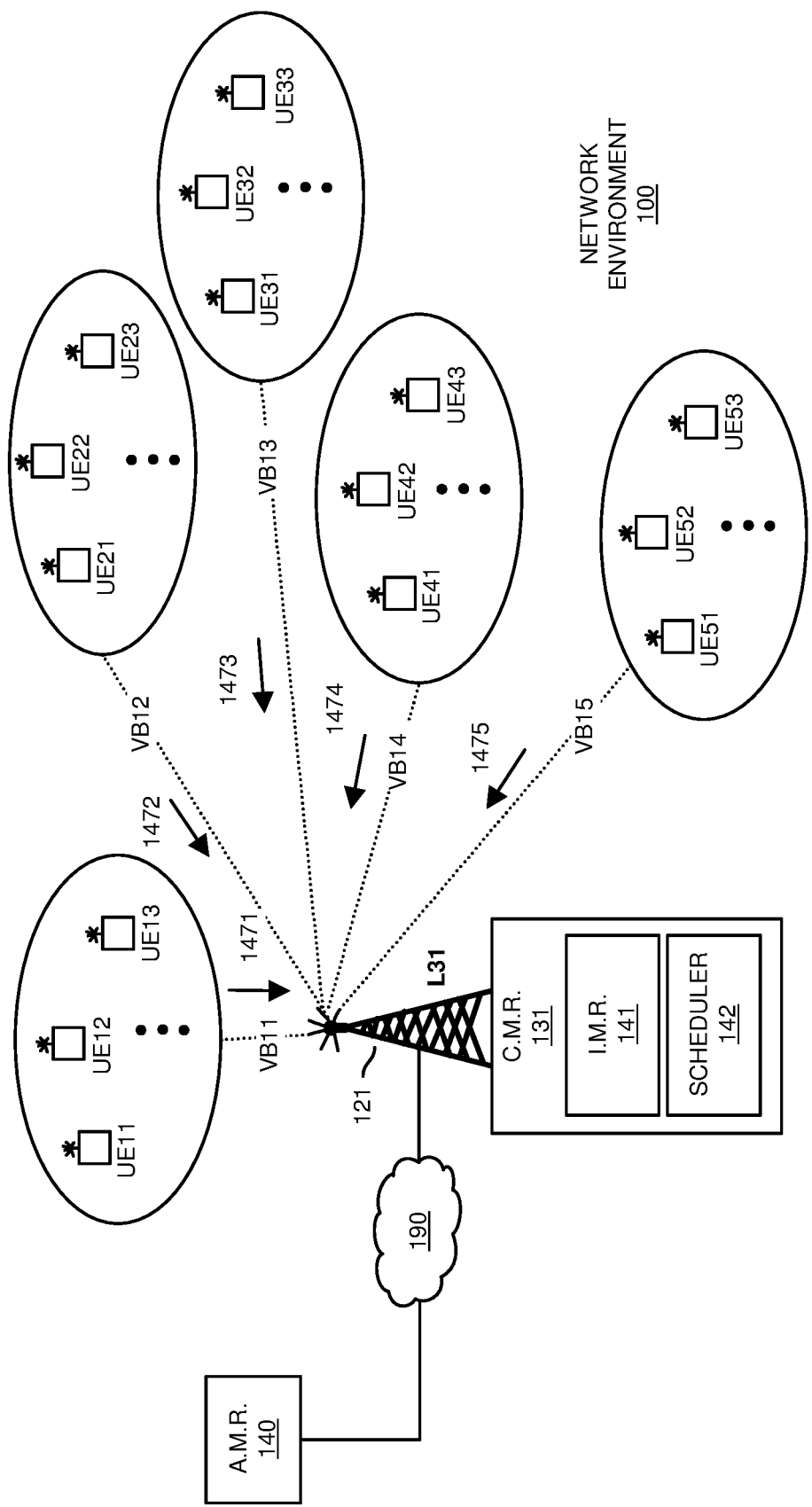
FIG. 14 is an example diagram illustrating receipt of performance feedback from one or more communication devices according to embodiments herein.

FIG. 14 is an example diagram illustrating receipt of feedback from one or more mobile communication devices according to embodiments herein.

Via communications 1471, the communication management resource 131 receives feedback 1471 such as indicating wireless power level information of each of the communication devices UE11, UE12, UE13, etc., receiving communications 1371 from the wireless base station 121. For example, the communication management resource 131 receives feedback from the communication device UE11 indicating a wireless power level of receiving a wireless communication from the wireless base station via resource block RB1; the communication management resource 131 receives feedback from the communication device UE12 indicating a wireless power level of receiving a wireless communication from the wireless base station via resource block RB2; the communication management resource 131 receives feedback from the communication device UE13 indicating a wireless power level of receiving a wireless communication from the wireless base station via resource block RB3; and so on.

The communication management resource 131 receives feedback 1472 such as indicating wireless power level information of each of the communication devices UE21, UE22, UE23, etc., receiving communications 1372 from the wireless base station 121. For example, the communication management resource 131 receives feedback from the communication device UE21 indicating a wireless power level of receiving a wireless communication from the wireless base station via resource block RB21; the communication management resource 131 receives feedback from the communication device UE22 indicating a wireless power level of receiving a wireless communications from the wireless base station via resource block RB22; the communication management resource 131 receives feedback from the communication device UE23 indicating a wireless power level of receiving a wireless communications from the wireless base station via resource block RB23; and so on.

The communication management resource 131 receives feedback 1473 such as indicating wireless power level information of each of the communication devices UE31, UE32, UE33, etc., receiving communications 1373 from the wireless base station 121. For example, the communication management resource 131 receives feedback from the communication device UE31 indicating a wireless power level of receiving a wireless communication from the wireless base station via resource block RB31; the communication management resource 131 receives feedback from the communication device UE32 indicating a wireless power level of receiving a wireless communication from the wireless base station via resource block RB32; the communication management resource 131 receives feedback from the communication device UE33 indicating a wireless power level of receiving a wireless communication from the wireless base station via resource block RB33; and so on.

The communication management resource 131 receives feedback 1474 such as indicating wireless power level information of each of the communication devices UE41, UE42, UE43, etc., receiving communications 1374 from the wireless base station 121. For example, the communication management resource 131 receives feedback from the communication device UE41 indicating a wireless power level of receiving a wireless communication from the wireless base station via resource block RB41; the communication management resource 131 receives feedback from the communication device UE42 indicating a wireless power level of receiving a wireless communication from the wireless base station via resource block RB42; the communication management resource 131 receives feedback from the communication device UE43 indicating a wireless power level of receiving a wireless communication from the wireless base station via resource block RB43; and so on.

The communication management resource 131 receives feedback 1475 such as indicating wireless power level information of each of the communication devices UE51, UE52, UE53, etc., receiving communications 1375 from the wireless base station 121. For example, the communication management resource 131 receives feedback from the communication device UE51 indicating a wireless power level of receiving a wireless communication from the wireless base station via resource block RB51; the communication management resource 131 receives feedback from the communication device UE52 indicating a wireless power level of receiving a wireless communication from the wireless base station via resource block RB52; the communication management resource 131 receives feedback from the communication device UE53 indicating a wireless power level of receiving a wireless communication from the wireless base station via resource block RB53; and so on.

In one embodiment, as previously discussed, the wireless base station (such as communication management resource or other suitable entity) can be configured to use a reverse look up table to determine the corresponding SNIR level for that CQI. For example, this can be the same method that UEs use to determine CQI level. When the wireless base station transmits signals to a particular UE, that UE measures the RSRP level from the transmitted signal from the wireless base station, and matches its measured RSRP level to SNIR level using its respective lookup table. Via another look-up table, the wireless base station uses the SNIR level (as from the respective communication device in feedback) to determine a CQI level from the SNIR.

Based on the SNIR value and RSSI (effectively interference measurement information associated with the respective virtual bandwidth used to communicate with the communication device), the wireless base station determines the amount interference in a corresponding 10 MHz bandwidth portion.

In a similar manner as previously discussed, based on feedback from each of the communication devices the interference management resource 141 determines an amount of wireless interference associated with use of each of the different virtual bandwidths VB11, VB12, VB13, VB14, and VB15.

Figure 15:
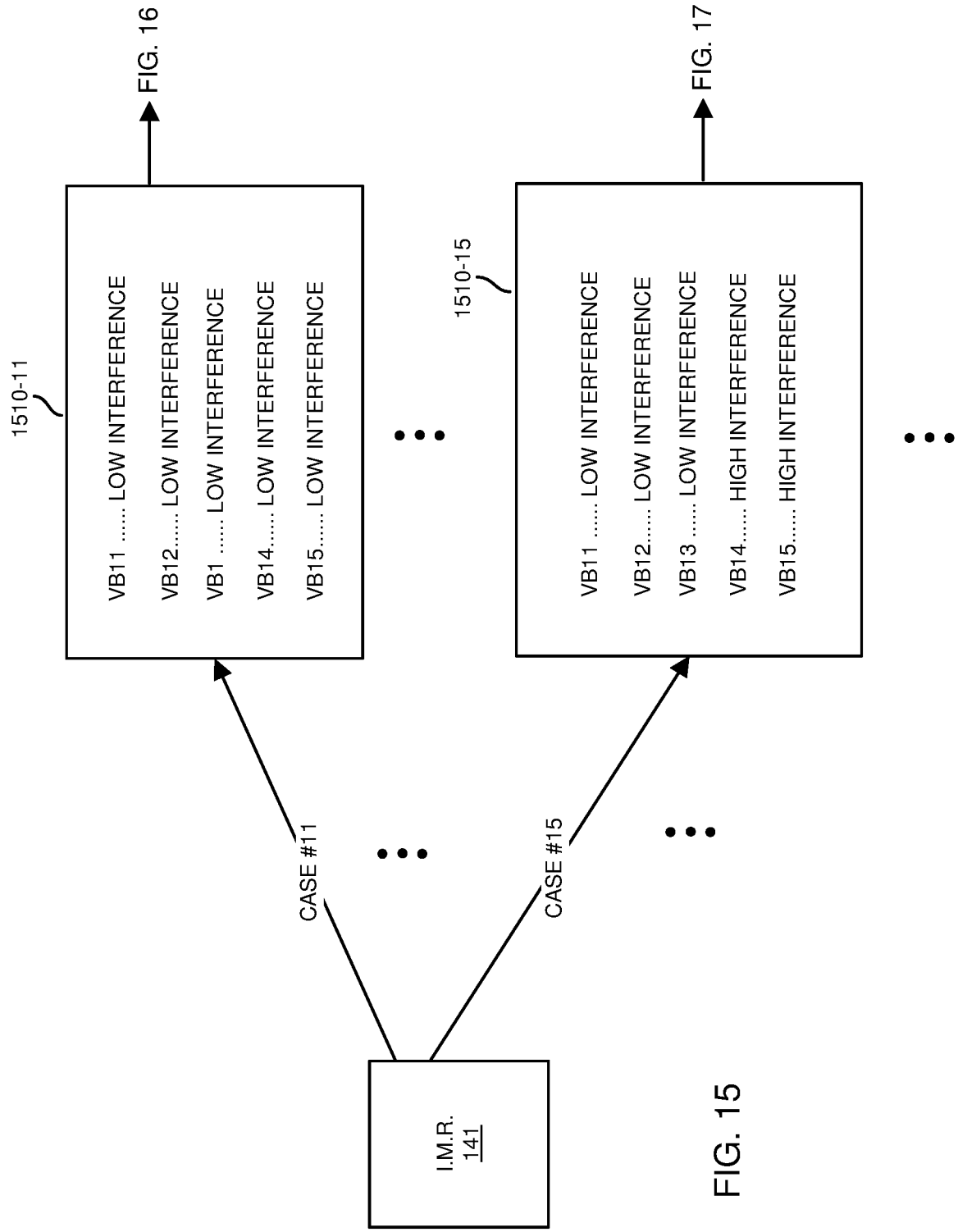
FIG. 15 is an example diagram illustrating analysis of received feedback and different possible results of detecting wireless interference associated with each of the different portions of virtual bandwidth according to embodiments herein.

FIG. 15 is an example diagram illustrating analysis of received feedback and different possible results (cases) of detecting wireless interference associated with each of the different portions of virtual bandwidth according to embodiments herein.

The interference management resource 141 tracks the amount of wireless interference in each of the virtual bandwidth VB11, VB12, VB13, VB14, and VB15 based on the feedback from the communication devices as previously discussed. In one embodiment, if greater than a predetermined percentage (such as 50% or other suitable value) of the communication devices in a respective virtual bandwidth and time slot or multiple timeslots indicates occurrence of wireless interference above a respective threshold level, the interference management resource 141 sets the virtual bandwidth to a high interference status value. In one embodiment, if greater than a predetermined percentage (such as 50% or other suitable value) of the communication devices in a respective virtual bandwidth indicates occurrence of wireless interference below a respective threshold level, the interference management resource 141 sets the virtual bandwidth to a low interference status value. In this manner, the interference management resource 141 identifies virtual bandwidths of the allocated bandwidth BW1 that provide high interference and those that provide low interference.

Figure 16:
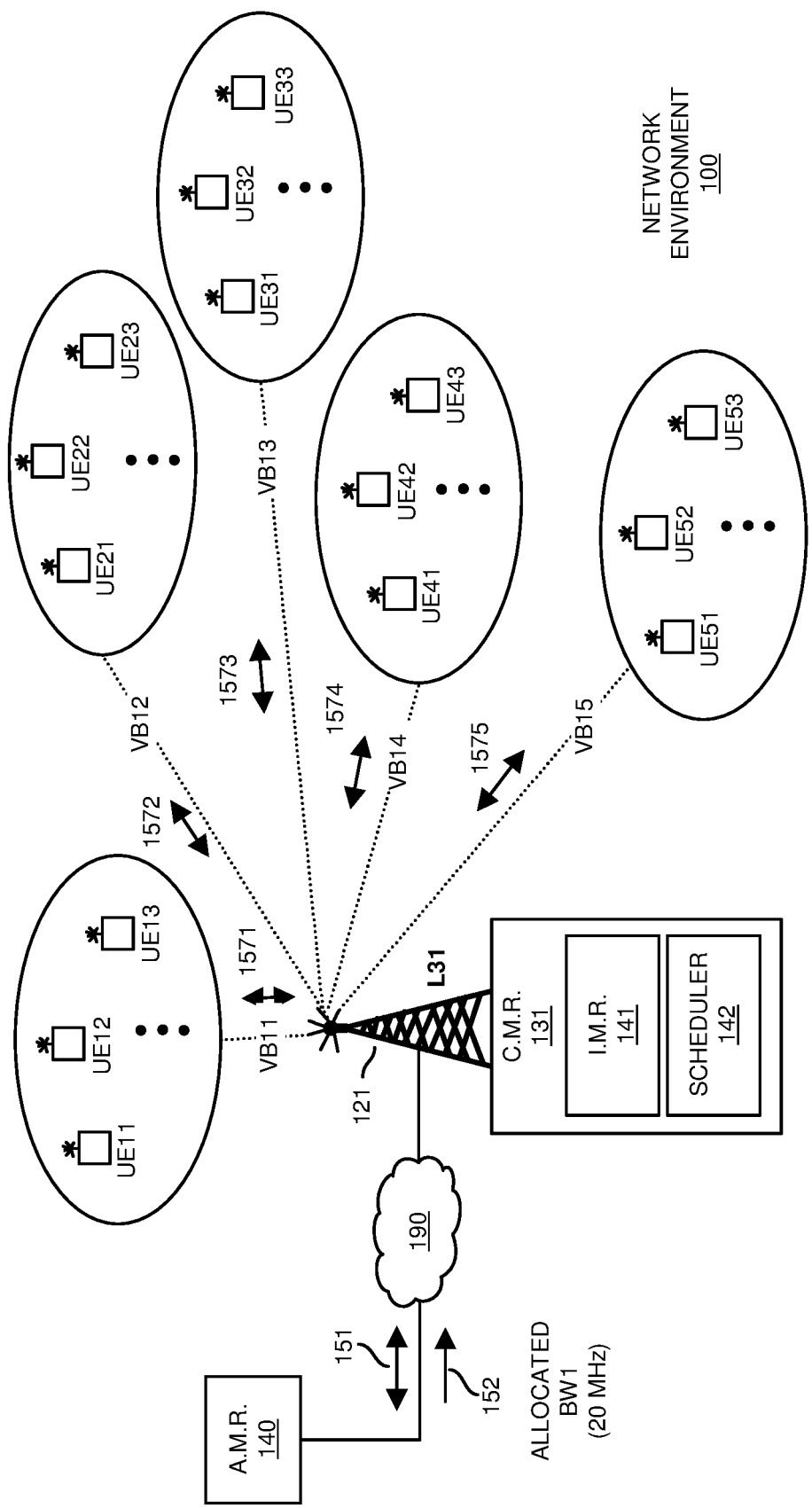
FIG. 16 is an example diagram illustrating use of the allocated wireless bandwidth to communicate between a respective wireless base station and multiple communication devices according to embodiments herein.

In a manner as previously discussed, in response to detecting low interference as in case #11 as indicated by the interference information 1510-11, the communication management resource 131 operates in the normal, mode as shown in FIG. 16.

Figure 17:
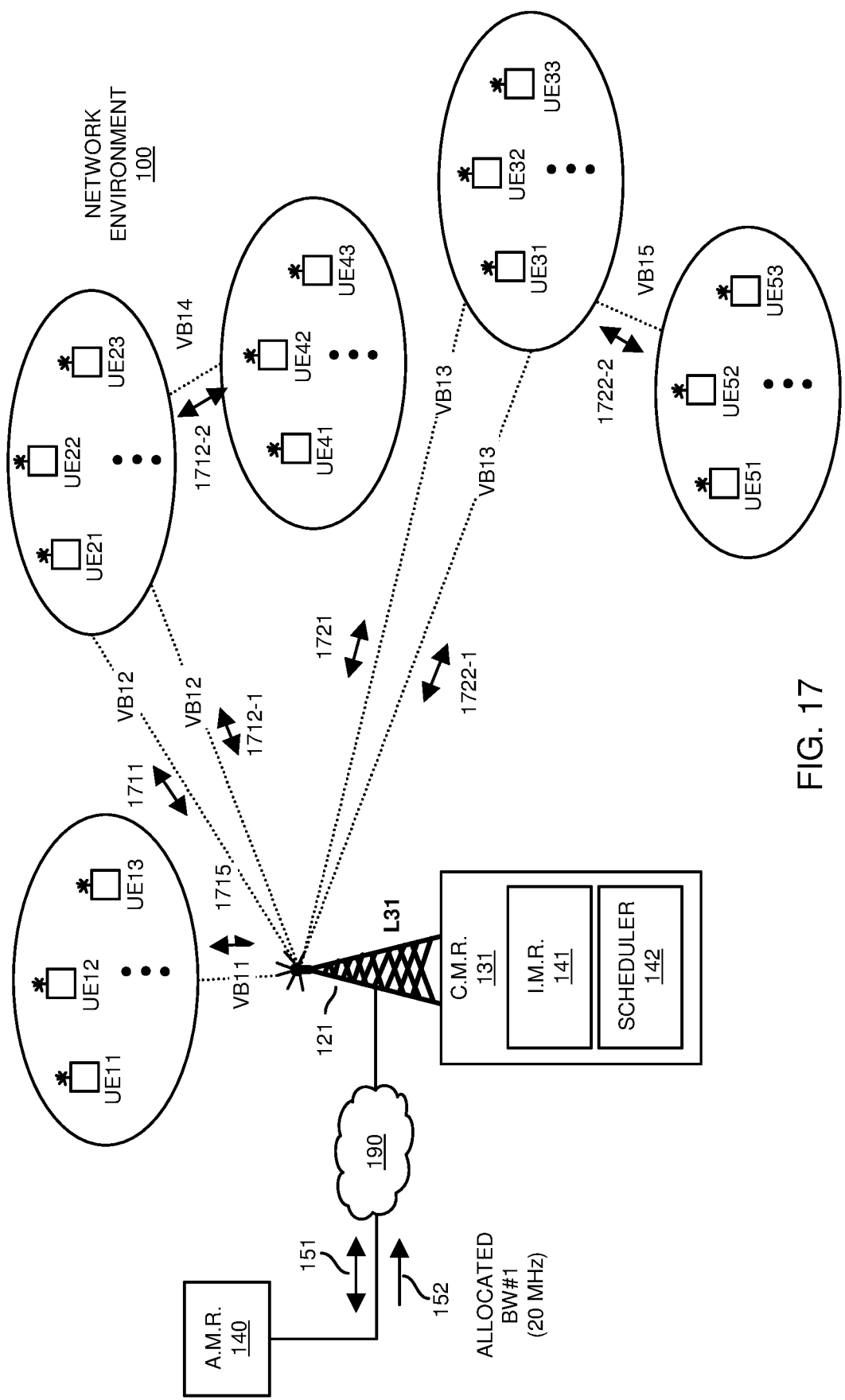
FIG. 17 is an example diagram illustrating implementation of a device-to-device communication mode to reduce wireless interference in response to detecting wireless interference during use of allocated bandwidth according to embodiments herein.

For case #15, in response to detecting wireless interference in virtual bandwidths VB14 and VB15, in a similar manner as previously discussed, the communication management resource 131 operates in the device-to-device communication mode as shown in FIG. 17 to alleviate occurrence of the wireless interference in those virtual bandwidths VB14 and VB15 and the bandwidth BW1 overall.

FIG. 16 is an example diagram illustrating use of the allocated wireless bandwidth to communicate between a respective wireless base station and multiple mobile communication devices according to embodiments herein.

In this example embodiment, none of the virtual bandwidths VB11, VB12, VB13, VB14, and VB15 experiences wireless interference above a threshold value as indicated by the interference information 1510-11.

In such an instance, the wireless base station 131 uses virtual bandwidth VB11 to support communications 1571 between the wireless base station 121 and the group of communication devices UE11, UE12, UE13, etc.; the wireless base station 131 uses virtual bandwidth VB12 to support communications 1572 between the wireless base station 121 and the group of communication devices UE21, UE22, UE23, etc.; the wireless base station 131 uses virtual bandwidth VB13 to support communications 1573 between the wireless base station 121 and the group of communication devices UE31, UE32, UE33, etc.; the wireless base station 131 uses virtual bandwidth VB14 to support communications 1574 between the wireless base station 121 and the group of communication devices UE41, UE42, UE43, etc.; the wireless base station 131 uses virtual bandwidth VB51 to support communications 1575 between the wireless base station 121 and the group of communication devices UE51, UE52, UE53, etc.

FIG. 17 is an example diagram illustrating implementation of a device-to-device communication mode in response to detecting wireless interference during use of allocated bandwidth according to embodiments herein.

In this example embodiment, the virtual bandwidths VB14 and VB15 experience wireless interference above a threshold value. In such an instance, the wireless base station 131 notifies the communication devices to operate in the device-to-device mode as shown in FIG. 17.

As further shown in this example embodiment, the group of communication devices UE41, UE42, UE43, etc., rely on wireless links through the group of communication devices UE21, UE22, UE23, etc., to the wireless base station 121 to access the remote network 190 and corresponding server resources. Additionally, the group of communication devices UE51, UE52, UE53, etc., rely on wireless links through the group of communication devices U31, UE32, UE33, etc., to the wireless base station 121 to access the remote network 190 and corresponding server resources.

More specifically, in response to notification to operate in the device-to-device mode based on detecting wireless interference is above a threshold level for the virtual bandwidth VB14 and wireless interference is below a threshold level for the virtual bandwidth VB12, the communication management resource 131 switches to operating a portion of the multiple communication devices (such as communication device UE11) in a device-to-device mode in which a first communication device UE21 (not experiencing the wireless interference) is designated as a primary UE. In such an instance, to alleviate interference, the communication management resource 131 notifies at least the communication device UE21 and communication device UE41 to operate in a device-to-device mode as shown in FIG. 17.

In the device-to-device mode of FIG. 17, the wireless base station 121 communicates messages (1711) targeted to the communication device UE21 using virtual bandwidth VB12. Communication device UE21 receives the messages 1711 over a first antenna A1 via virtual bandwidth VB12 using resource blocks in a manner as previously discussed.

The wireless base station 121 communicates messages (1712-1) targeted to the communication device UE21 over virtual bandwidth VB12 as well. The communication device UE21 receives the messages 1712-1 over antenna A2. The communication device UE21 buffers and then forwards the received messages 1712-1 as wireless communications 1712-2 from antenna A2 of the UE21 over virtual bandwidth VB14 to the communication device UE41. In a reverse direction, the communication device UE21 receives the messages from UE41 over antenna A2. The communication device UE21 buffers and then forwards the received messages from UE41 as wireless communications 1712-1 from antenna A2 of the UE21 over virtual bandwidth VB12 to the wireless base station 121.

In a similar manner, the UE22 provides wireless connectivity of the communication device UE42 to the wireless base station 121; the UE23 provides wireless connectivity of the communication device UE43 to the wireless base station 121; and so on.

In response to notification to operate in the device-to-device mode based on detecting wireless interference is above a threshold level for the virtual bandwidth VB15 and wireless interference is below a threshold level for the virtual bandwidth VB13, the communication management resource 131 switches to operating a portion of the multiple communication devices (such as communication device UE31) in a device-to-device mode in which the communication device UE31 (not experiencing the wireless interference) is designated as a primary UE. In such an instance, to alleviate interference, the communication management resource 131 notifies the communication device UE31 and communication device UE51 to operate in a device-to-device mode as shown in FIG. 17.

In the device-to-device mode of FIG. 17, the wireless base station 121 communicates messages (1721) targeted to the communication device UE31 using virtual bandwidth VB13. Communication device UE31 receives the messages 1731 over a first antenna A1 via virtual bandwidth VB13 using resource blocks in a manner as previously discussed.

The wireless base station 121 communicates messages (1722-1) targeted to the communication device UE51 over virtual bandwidth VB13 as well. The communication device UE31 receives the messages 1722-1 over antenna A2. The communication device UE31 buffers and then forwards the received messages 1722-1 as wireless communications 1722-2 from antenna A2 of the UE31 over virtual bandwidth VB15 to the communication device UE51. In a reverse direction, the communication device UE31 receives the messages from UE51 over antenna A2. The communication device UE31 buffers and then forwards the received messages from UE51 as wireless communications 1722-1 from antenna A2 of the UE31 over virtual bandwidth VB13 to the wireless base station 121.

In a similar manner, the UE32 provides wireless connectivity of the communication device UE52 to the wireless base station 121; the UE33 provides wireless connectivity of the communication device UE53 to the wireless base station 121; and so on.

The dynamic transition to implementing the device-to-device communication mode in this example embodiment alleviates (such as reduces) wireless interference in the network environment 100 (especially virtual bandwidths VB14 and VB15), lessening the likelihood that the allocated wireless bandwidth BW1 will be revoked (deallocated) by the allocation management resource 140 (such as spectrum access system). In other words, in this example, wirelessly communicating messages over virtual bandwidth VB14 from the wireless base station 121 to the communication devices UE41, UE42, UE43, etc., causes undesirable wireless interference above a threshold value. Since operation in the device-to-device mode of FIG. 17 reduces wireless interference associated with use of the bandwidth BW1, there is no need for the allocation management resource 140 to deallocate or revoke use of the allocated wireless bandwidth BW1. Thus, operation in the device-to-device mode as discussed herein in FIG. 17 is useful to reduce wireless interference and the likelihood that the allocation management resource 140 will need to revoke allocation of the wireless bandwidth BW1.

Figure 18:
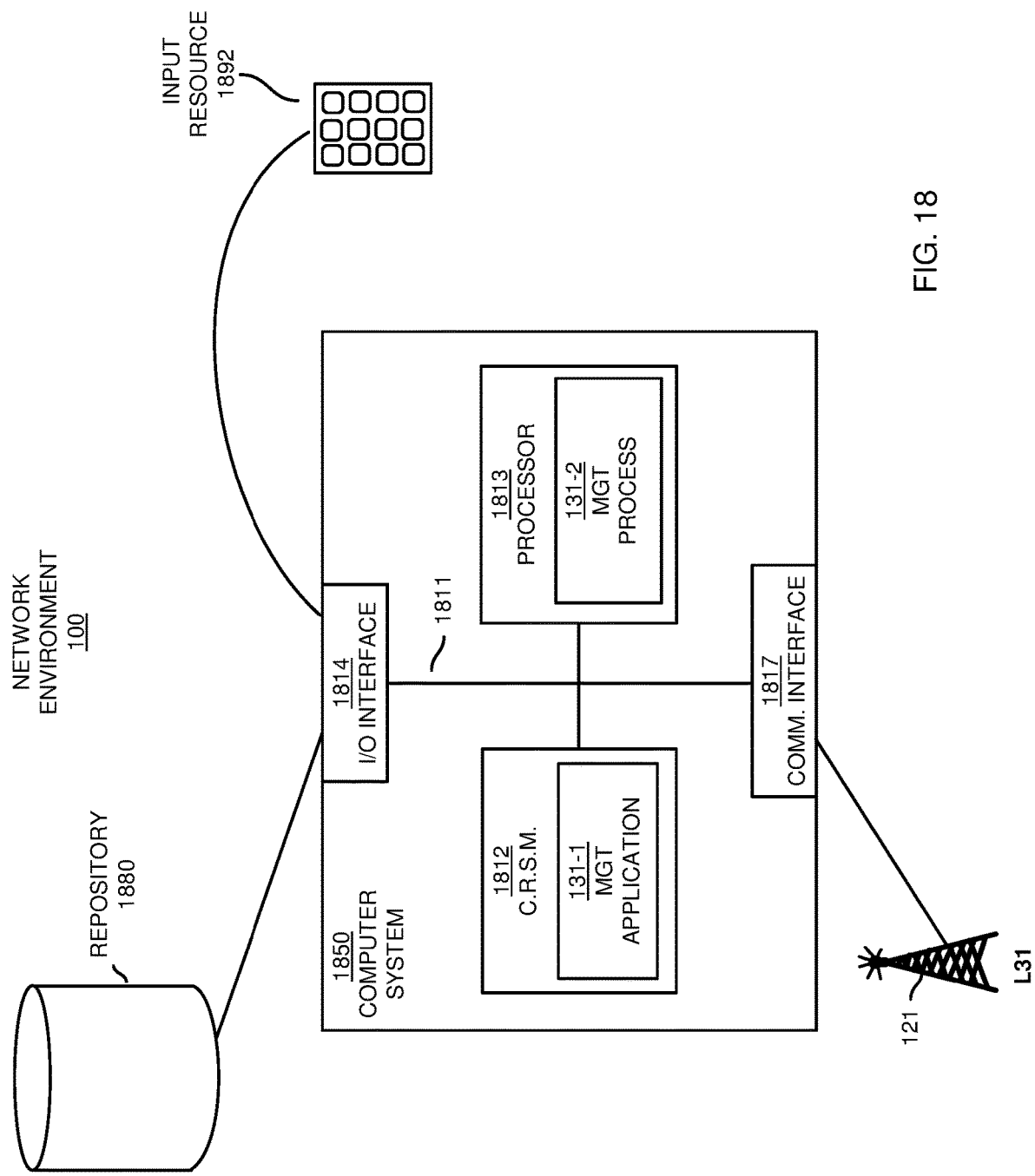
FIG. 18 is an example diagram illustrating example computer architecture operable to execute one or more operations according to embodiments herein.

FIG. 18 is an example block diagram of a computer system for implementing any of the operations as previously discussed according to embodiments herein.

Any of the resources (such as mobile communication devices, wireless access points, wireless stations, wireless base stations, communication management resource, bandwidth management resource, communication management resource, allocation management resource, etc.) as discussed herein can be configured to include computer processor hardware and/or corresponding executable instructions to carry out the different operations as discussed herein.

As shown, computer system 1850 of the present example includes an interconnect 1811 that coupling computer readable storage media 1812 such as a non-transitory type of media (which can be any suitable type of hardware storage medium in which digital information can be stored and retrieved), a processor 1813 (computer processor hardware), I/O interface 1814, and a communications interface 1817.

I/O interface(s) 1814 supports connectivity to repository 1880 and input resource 1892.

Computer readable storage medium 1812 can be any hardware storage device such as memory, optical storage, hard drive, floppy disk, etc. In one embodiment, the computer readable storage medium 1812 stores instructions and/or data.

As shown, computer readable storage media 1812 can be encoded with management application 131-1 (e.g., including instructions) to carry out any of the operations as discussed herein.

During operation of one embodiment, processor 1813 accesses computer readable storage media 1812 via the use of interconnect 1811 in order to launch, run, execute, interpret or otherwise perform the instructions in management application 131-1 stored on computer readable storage medium 1812. Execution of the management application 131-1 (such as communication management resource) produces management process 131-2 to carry out any of the operations and/or processes as discussed herein.

Those skilled in the art will understand that the computer system 1850 can include other processes and/or software and hardware components, such as an operating system that controls allocation and use of hardware resources to execute management application 131-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1950 may reside at any location or can be included in any suitable resource in any network environment to implement functionality as discussed herein.

Functionality supported by the different resources will now be discussed via flowcharts in FIG. 19. Note that the steps in the flowcharts below can be executed in any suitable order.

Figure 19:
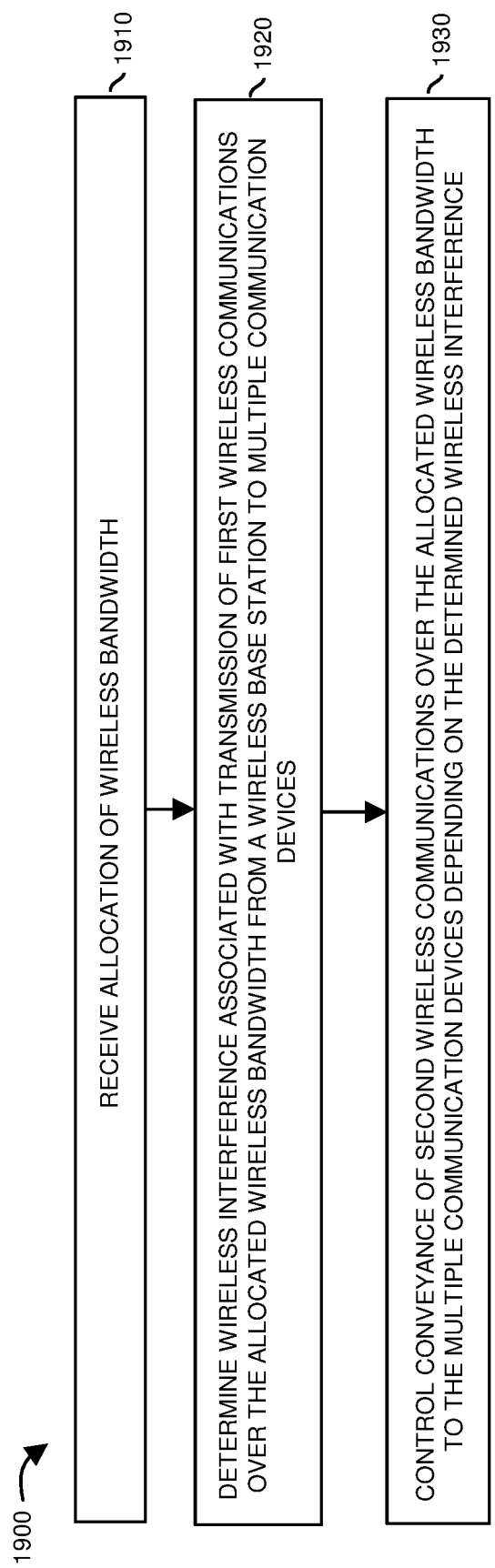
FIG. 19 is an example diagram illustrating a method according to embodiments herein.

FIG. 19 is a flowchart 1900 illustrating an example method according to embodiments. Note that there will be some overlap with respect to concepts as discussed above.

In processing operation 1910, the communication management resource 131 receives allocation of wireless bandwidth (such as 20 MHz or other suitable bandwidth) via communications 152.

In processing operation 1920, the communication management resource 131 determines wireless interference associated with transmission of first wireless communications (such as 171, 172, etc.) over the allocated wireless bandwidth from a wireless base station 121 to multiple communication devices (such as user equipment UE11, UE12, UE13, . . . , UE21, UE22, UE23, . . . ).

In processing operation 1930, the communication management resource 131 controls conveyance of second wireless communications (subsequent communications) over the allocated wireless bandwidth to the multiple communication devices depending on the determined wireless interference as indicated by the wireless interference information 710.

Note again that techniques herein are well suited to facilitate improved wireless communication in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving allocation of a wireless channel from an allocation management resource over a network;
   partitioning the allocated wireless channel received from the allocation management resource into different bandwidth portions;
   determining wireless interference associated with transmission of first wireless communications over the different bandwidth portions of the allocated wireless channel from a wireless base station; and
   controlling conveyance of second wireless communications over at least one of the different bandwidth portions of the allocated wireless channel to multiple communication devices depending on the determined wireless interference.

2. The method as in claim 1, wherein determining the wireless interference associated with transmission of the first wireless communications over the allocated wireless channel includes receiving feedback from the multiple communication devices indicating wireless power levels of the multiple communication devices receiving the first wireless communications.

3. The method as in claim 1, wherein controlling conveyance of the second wireless communications over at least one of the different bandwidth portions of the allocated wireless channel includes:
   operating a portion of the multiple communication devices in a device-to-device mode in which a first communication device of the multiple communication devices receives a wireless message from the wireless base station and wirelessly transmits the wireless message to a second communication device of the multiple communication devices in response to detecting that the wireless interference is above a threshold level.

4. The method as in claim 1, wherein determining the wireless interference includes:
   partitioning the allocated wireless channel into a first bandwidth portion and a second bandwidth portion;
   communicating a first portion of the first wireless communications from the wireless base station over the first bandwidth portion to a first communication device of the multiple communication devices; and
   communicating a second portion of the first wireless communications from the wireless base station over the second bandwidth portion to a second communication device of the multiple communication devices.

5. The method as in claim 4, wherein determining the wireless interference further includes:
   receiving first feedback, the first feedback indicating an amount of wireless interference associated with the first communication device receiving the first portion of the first wireless communications; and
   receiving second feedback, the second feedback indicating an amount of wireless interference associated with the second communication device receiving the second portion of the first wireless communications.

6. The method as in claim 5, wherein determining the wireless interference further includes:
   producing a first wireless performance metric indicating the amount of wireless interference associated with communicating the first portion of the first wireless communications from the wireless base station to the first communication device; and
   producing a second wireless performance metric indicating the amount of wireless interference associated with communicating the second portion of wireless messages from the wireless base station to the second communication device.

7. The method as in claim 4 further comprising:
   partitioning the allocated wireless channel received from the allocation management resource into the different bandwidth portions in response to detecting that the wireless interference associated with communicating messages over the allocated wireless channel to the multiple communication devices is above a threshold; and
   identifying a respective level of wireless interference associated with communicating over each of the different bandwidth portions of the allocated wireless channel.

8. The method as in claim 1, wherein the wireless channel is allocated from a CBRS (Citizens Band Radio Service) bandwidth; and
   wherein determining the wireless interference includes simultaneously communicating: i) a first wireless message from the wireless base station over the wireless channel to a first communication device of the multiple communication devices, and ii) a second wireless message from the wireless base station over the wireless channel to a second communication device of the multiple communication devices.

9. The method as in claim 8, wherein controlling conveyance of the first wireless communications over the allocated wireless channel to the multiple communication devices depending on the determined wireless interference includes:
   in response to detecting wireless interference above a threshold value for the second wireless message communicated from the wireless base station over the wireless channel to the second communication device, controlling the first communication device to operate in a device-to-device communications mode in which the first communication device conveys messages from the wireless base station to the second communication device.

10. The method as in claim 1 further comprising:
    partitioning the wireless channel into a first bandwidth portion and a second bandwidth portion; and
    determining the wireless interference via simultaneous transmission of the first wireless communications over the first bandwidth portion and the second bandwidth portion.

11. The method as in claim 10, wherein the first bandwidth portion and the second bandwidth portion have a same carrier frequency in which the wireless base station simultaneously transmits the first wireless communications to the multiple communication devices.

12. The method as in claim 1, wherein the wireless channel is allocated from a CBRS (Citizens Band Radio Service) bandwidth.

13. The method as in claim 1 further comprising:
    partitioning the wireless channel into N virtual bandwidths, where N is an integer greater than or equal to 2; and
    determining the wireless interference via transmission of the first communications over the N virtual bandwidths.

14. The method as in claim 1, wherein the allocated wireless channel is partitioned into the different bandwidth portions for testing occurrence of wireless interference in each of the different bandwidth portions.

15. The method as in claim 1, wherein partitioning the allocated wireless channel includes splitting the allocated wireless channel into a first bandwidth portion and a second bandwidth portion, the first bandwidth portion being a first frequency range within the allocated wireless channel, the second bandwidth portion being a second frequency range within the allocated wireless channel.

16. The method as in claim 15, wherein determining the wireless interference associated with transmission of first wireless communications includes:
communicating a first portion of the first wireless communications from the wireless base station over the first bandwidth portion;
communicating a second portion of the first wireless communications from the wireless base station over the second bandwidth portion; and
receiving feedback indicating that wireless interference associated with communicating the first portion of the first wireless communications and communicating the second portion of the first wireless communications is not above an interference threshold level.

17. The method as in claim 16, wherein controlling the conveyance of second wireless communications over at least one of the different bandwidth portions of the allocated wireless channel to multiple communication devices includes:
utilizing the first bandwidth portion to communicate between the wireless base station and a first group of communication devices; and
utilizing the second bandwidth portion to communicate between the wireless base station and a second group of communication devices.

18. The method as in claim 1, wherein the different bandwidth portions include a first bandwidth portion of first sub-channels and a second bandwidth portion of second sub-channels; and
wherein controlling conveyance of the second wireless communications over at least one of the different bandwidth portions of the allocated wireless channel to multiple communication devices includes: i) communicating a first portion of the second wireless communications over the first bandwidth portion of first sub-channels to first communication devices, and ii) communicating a second portion of the second wireless communications over the second bandwidth portion of second sub-channels to second communication devices.

19. The method as in claim 1, wherein partitioning the allocated wireless channel includes splitting the allocated wireless channel into a first bandwidth portion and a second bandwidth portion, the first bandwidth portion being non-overlapping with respect to the second bandwidth portion;
wherein determining wireless interference includes detecting wireless interference below a threshold level based on the wireless base station transmitting over the first bandwidth portion to first communication devices and the wireless base station transmitting over the second bandwidth portion to second communication devices; and
wherein controlling conveyance of second wireless communications over at least one of the different bandwidth portions of the allocated wireless channel includes: in response to detecting the wireless interference below the threshold level: i) implementing the first bandwidth portion to support a first portion of the second wireless communications from the wireless base station to the first communication devices, and ii) implementing the second bandwidth portion to support a second portion of the second wireless communications from the wireless base station to the second communication devices.

20. The method as in claim 1, wherein partitioning the allocated wireless channel includes splitting the allocated wireless channel into a first bandwidth portion and a second bandwidth portion, the first bandwidth portion being non-overlapping with respect to the second bandwidth portion;
wherein determining wireless interference includes detecting wireless interference above a threshold level based on the wireless base station transmitting over the first bandwidth portion to a first communication device and the wireless base station transmitting over the second bandwidth portion to a second communication device; and
wherein controlling conveyance of second wireless communications over at least one of the different bandwidth portions of the allocated wireless channel includes: in response to detecting the wireless interference above the threshold level i) implementing the first bandwidth portion to support a first portion of the second wireless communications from the wireless base station to the first communication device, and ii) implementing the second bandwidth portion to support a second portion of the second wireless communications conveyed between the first communication device and the second communication device.

21. The method as in claim 1, wherein the different bandwidth portions include a first bandwidth portion and a second bandwidth portion, the first bandwidth portion being non-overlapping with respect to the second bandwidth portion.

22. The method as in claim 21, wherein determining the wireless interference further includes: i) producing a first interference metric indicating a first amount of wireless interference associated with communicating a first portion of the first wireless communications via the first bandwidth portion from the wireless base station to a first communication device, and ii) producing a second interference metric indicating a second amount of wireless interference associated with communicating a second portion of the first wireless communications via the second bandwidth portion from the wireless base station to a second communication device; and
controlling conveyance of the second wireless communications based on a magnitude of the first interference metric and a magnitude of the second interference metric.

23. The method as in claim 1, wherein partitioning the allocated wireless channel includes splitting the allocated wireless channel into a first bandwidth portion and a second bandwidth portion; and
wherein determining wireless interference includes detecting wireless interference below a threshold level based on the wireless base station transmitting over the first bandwidth portion to first communication devices and the wireless base station transmitting over the second bandwidth portion to second communication devices.

24. The method as in claim 23, wherein the first bandwidth portion is non-overlapping with respect to the second bandwidth portion.

25. The method as in claim 1, wherein controlling conveyance of second wireless communications over at least one of the different bandwidth portions of the allocated wireless channel includes: in response to detecting the wireless interference above a threshold level: i) implementing a first bandwidth portion of the wireless channel to support a first portion of the second wireless communications from the wireless base station to a first communication device, and ii) implementing a second bandwidth portion of the wireless channel to support a second portion of the second wireless communications conveyed between the first communication device and a second communication device.

26. The method as in claim 1, wherein determining wireless interference includes: i) detecting first wireless interference below a threshold level for a first portion of the first communications transmitted from the wireless base station over a first bandwidth portion of the wireless channel to a first communication device; and ii) detecting second wireless interference above the threshold level for a second portion of the first communications transmitted from the wireless base station over a second bandwidth portion of the wireless channel to a second communication device.

27. A system comprising:
communication management hardware operative to:
receive allocation of a wireless channel from an allocation management resource over a network;
partition the allocated wireless channel received from the allocation management resource into different bandwidth portions;
determine wireless interference associated with transmission of first wireless communications over the different bandwidth portions of the allocated wireless channel from a wireless base station; and
control conveyance of second wireless communications over at least one of the different bandwidth portions of the allocated wireless channel to multiple communication devices depending on the determined wireless interference.

28. The system as in claim 27, wherein the communication management hardware is further operative to:
receive feedback from the multiple communication devices indicating wireless power levels of the multiple communication devices receiving the first wireless communications.

29. The system as in claim 27, wherein the communication management hardware is further operative to:
operate a portion of the multiple communication devices in a device-to-device mode in which a first communication device of the multiple communication devices receives a wireless message from the wireless base station and wirelessly transmits the wireless message to a second communication device of the multiple communication devices in response to detecting that the wireless interference is above a threshold level.

30. The system as in claim 27, wherein the communication management hardware is further operative to:
partition the allocated wireless channel into a first virtual bandwidth and a second virtual bandwidth;
communicate a first portion of wireless messages from the wireless base station over the first virtual bandwidth to a first communication device of the multiple communication devices; and
communicate a second portion of wireless messages from the wireless base station over the second virtual bandwidth to a second communication device of the multiple communication devices.

31. The system as in claim 30, wherein the communication management hardware is further operative to:
receive first feedback, the first feedback indicating an amount of wireless interference associated with the first communication device receiving the first portion of wireless messages; and
receive second feedback, the second feedback indicating an amount of wireless interference associated with the second communication device receiving the second portion of wireless messages.

32. The system as in claim 31, wherein the communication management hardware is further operative to:
produce a first wireless performance metric indicating the amount of wireless interference associated with communicating the first portion of wireless messages from the wireless base station to the first communication device; and
produce a second wireless performance metric indicating the amount of wireless interference associated with communicating the second portion of wireless messages from the wireless base station to the second communication device.

33. The system as in claim 30, wherein the communication management hardware is further operative to:
in response to detecting that the wireless interference associated with communicating the wireless messages over the allocated wireless channel to the multiple communication devices is above a threshold, partition the allocated wireless channel into different number of partitions; and
identify a respective level of wireless interference associated with communicating over each of the different number of partitions of the allocated wireless channel.

34. The system as in claim 27, wherein the allocated wireless channel is a wireless channel allocated from a CBRS (Citizens Band Radio Service) bandwidth; and
wherein the communication management hardware is further operative to: simultaneously communicate: i) a first wireless message from the wireless base station over the wireless channel to a first communication device of the multiple communication devices, and ii) a second wireless message from the wireless base station over the wireless channel to a second communication device of the multiple communication devices.

35. The system as in claim 34, wherein the communication management hardware is further operative to:
in response to detecting wireless interference above a threshold value for the first wireless message communicated from the wireless base station over the wireless channel to the first communication device, control the first communication device to operate in a device-to-device communications mode in which the first communication device conveys messages from the wireless base station to the second communication device.

36. The system as in claim 27,
wherein the communication management hardware is further operative to: i) partition the wireless channel into a first virtual band and a second virtual band; and ii) determine the wireless interference via simultaneous transmission of the first wireless communications over the first virtual band and the second virtual band.

37. The system as in claim 27, wherein the first virtual band and the second virtual band have a same carrier frequency in which the wireless base station simultaneously transmits the first wireless communications to the multiple communication devices.

38. The system as in claim 27, wherein the allocated wireless channel is allocated from a CBRS (Citizens Band Radio Service) bandwidth.

39. Computer-readable storage hardware having instructions stored thereon, the instructions, when carried out by computer processor hardware, cause the computer processor hardware to:
  receive allocation of a wireless channel from an allocation management resource over a network;
  partition the allocated wireless channel received from the allocation management resource into different bandwidth portions;
  determine wireless interference associated with transmission of first wireless communications over the different bandwidth portions of the allocated wireless channel from a wireless base station; and
  control conveyance of second wireless communications over at least one of the different bandwidth portions of the allocated wireless channel to multiple communication devices depending on the determined wireless interference.

* * * * *